US008437547B2

(12) United States Patent
Meiers

(10) Patent No.: US 8,437,547 B2
(45) Date of Patent: May 7, 2013

(54) DEVICE AND METHOD FOR DETERMINING AN EDGE HISTOGRAM, DEVICE AND METHOD FOR STORING AN IMAGE IN AN IMAGE DATABASE, DEVICE AND METHOD FOR FINDING TWO SIMILAR IMAGES AND COMPUTER PROGRAM

(75) Inventor: Thomas Meiers, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 741 days.

(21) Appl. No.: 12/596,477

(22) PCT Filed: Apr. 22, 2008

(86) PCT No.: PCT/EP2008/003233
§ 371 (c)(1),
(2), (4) Date: Oct. 22, 2009

(87) PCT Pub. No.: WO2008/128759
PCT Pub. Date: Oct. 30, 2008

(65) Prior Publication Data
US 2010/0111416 A1    May 6, 2010

(30) Foreign Application Priority Data

Apr. 23, 2007 (DE) .......................... 10 2007 019 057

(51) Int. Cl.
*G06K 9/00*    (2006.01)
*G06K 9/40*    (2006.01)

(52) U.S. Cl.
USPC .......................................... 382/168; 382/263

(58) Field of Classification Search .......... 382/162–167, 382/168–172, 254–275
See application file for complete search history.

(56) References Cited

U.S. PATENT DOCUMENTS

| 5,668,888 | A  | * | 9/1997 | Doi et al. ....................... 382/132 |
| 6,445,818 | B1 |   | 9/2002 | Kim et al. |
| 6,807,298 | B1 |   | 10/2004 | Park et al. |
| 2003/0095714 | A1 | * | 5/2003 | Avinash ....................... 382/260 |

FOREIGN PATENT DOCUMENTS

| WO | 01/41071 A1 | 6/2001 |
| WO | 02/33978 A1 | 4/2002 |

OTHER PUBLICATIONS

Cao et al., "A Method for Classification of Scenery Documentary Using MPEG-7 Edge Histogram Descriptor", Proceedings of 2005 IEEE International Workshop VLSI Design & Video Tech., May 28-30, 2005, pp. 105-108.
Won et al., "Efficient Use of MPEG-7 Edge Histogram Descriptor," ETRI Journal, Feb. 2002, vol. 24, No. 1, pp. 23-30.

(Continued)

*Primary Examiner* — Alex Liew
(74) *Attorney, Agent, or Firm* — Keating & Bennett, LLP

(57) ABSTRACT

A device for determining an edge histogram of an image based on information about a gradient strength and a gradient direction of a local gradient in an image content of a partial image of the image includes an allocator which is implemented to allocate the information about the gradient strength and the gradient direction based on an allocation regulation to an edge image in order to obtain edge type information. The allocation regulation is selected such that with a predetermined gradient direction at least three different allocated edge types exist mirroring the different gradient strengths. The device further includes an edge histogram determiner which is implemented to determine the edge histogram based on the edge type information so that in the edge type histogram at least three edge types having different allocated gradient strengths may be differentiated.

33 Claims, 14 Drawing Sheets

OTHER PUBLICATIONS

Shen et al., "Feature Frequency Matrices as Texture Image Representation," Pattern Recognition Letters 13, Mar. 1992, pp. 195-205.
Abdel-Mottaleb et al., "Multimedia Descriptions Based on MPEG-7: Extraction and Applications," IEEE Transactions on Multimedia, Jun. 2004, vol. 6, No. 3, pp. 459-468.
Manjunath et al., "Color and Texture Descriptors" IEEE Transactions on Circuits and System for Video Technology, Jun. 2001, vol. 11, No. 6, pp. 703-715.
Tao et al.,"Recognition and Retrieval of Textured Images Using Gradient Indexing," Image Processing, Oct. 1998, pp. 57-61.
Moghaddam et al., "Defining Image Content with Multiple Regions-of-Interest", IEEE Workshop, Jan. 1, 1999, pp. 89-93.
Official Communication issued in International Patent Application No. PCT/EP2008/003233, mailed on Nov. 20, 2008.
Official Communication issued in corresponding European Patent Application No. 09013179.8, mailed on Apr. 16, 2010.

* cited by examiner

DEVICE AND METHOD FOR DETERMINING AN EDGE HISTOGRAM, DEVICE AND METHOD FOR STORING AN IMAGE IN AN IMAGE DATABASE, DEVICE AND METHOD FOR FINDING TWO SIMILAR IMAGES AND COMPUTER PROGRAM

BACKGROUND OF THE INVENTION

The present invention generally relates to a device and a method for determining an edge histogram of an image, to a device and a method for storing an image in an image database, to a device and a method for finding two similar images and to a computer program.

According to one embodiment, the present invention further relates to a method for generating a texture edge histogram of digital images. According to a further embodiment, the present invention relates to a content-based description of images based on color, texture and edge information with the aim of being able to execute a similarity search and/or a classification of images into semantic groups.

For a number of years, the size of digital image archives has been growing immensely, even gigantically. Newspaper publishing agencies, news agencies, internet communities but also more and more private users are archiving a wealth of images. Along with the size of the archives, the difficulty of finding archived images is also increasing. The problem of searching increases when the images are not described sensibly or sufficiently by key words.

Thus, methods have been developed for describing images based on their visual characteristics and for executing search processes based on these visual characteristics. The visual characteristics of the images are, for example, characterized by color features, texture features, edge features and/or shape features, so-called descriptors. When archiving the images, these descriptors are, for example, extracted automatically and stored in a database. For each descriptor, a distance measure is defined, for example, which indicates the similarity of two images with regard to this descriptor. A challenge or also a problem in the definition of a descriptor is to illustrate and/or map a similarity of two images "perceived" (for example by a human observer) with regard to a visual feature via the distance measure as optimally as possible.

A content-based similarity search with regard to a descriptor is executed, for example, in the following way: a user provides an exemplary image. A search engine reads the corresponding descriptor with regard to this example image from a database and calculates the distance measures to all images in the database via the similarity measure of the descriptor. Images with a low distance (images with a sufficiently low distance which is, for example, smaller than a predetermined threshold value) are output as a result of the search.

Very different methods have been developed to describe images based on their color features, texture features and/or edge features in the form of descriptors. Each of these methods contributes in its own way to finding images based on their similarity. Further, a new standardization project MPEG-7 was initiated in which a visual description of multimedia data via descriptors is defined. However, these descriptors also have flaws.

Thus, an edge histogram descriptor which was developed especially for describing edge frequencies in images shows good results for images in which clearly outlined objects are in contrast to a background. However, the mentioned edge histogram descriptor, described, for example in U.S. Pat. No. 6,807,298 B1, does not show such good results when extensive textures are contained in images, like, e.g., water surfaces or treetops. Such textures are also detected as edges and mixed with clearly visible edges.

Also in the standardization project MPEG-7 descriptors exist which may be used specifically for textures. Thus, for example in WO 01/41071 A1, a so-called "homogenous texture descriptor" is described. The mentioned descriptors are generally based on an analysis of frequencies according to a Fourier transformation which is applied, for example, across the whole image. Such descriptors are very well suited—in accordance with their purpose—when regular patterns, like, e.g., carpet patterns or wallpaper patterns, are to be described. The mentioned descriptors are, however, hardly suitable with photographs.

Other methods use histograms of a gradient angle of each pixel, whereby very good images may be detected with clearly outlined objects. Such descriptions often fail, however, when images contain finely structured areas (like, e.g., water surfaces, fine branches of trees, clouds, etc.).

It is thus to be noted that methods exist which either concentrate on the detection of clear edges or which specifically describe certain fine regular textures.

SUMMARY

According to an embodiment, a device for determining an edge histogram of an image based on information about a gradient strength and a gradient direction of a local gradient in an image content of a partial image of the image may have an allocator which is implemented to allocate the information on the gradient strength and gradient direction based on an allocation regulation to an edge type to acquire an edge type information, wherein the allocation regulation is selected so that with a given gradient direction at least three different allocated edge types exist mirroring different gradient strengths; and an edge histogram determiner which is implemented to determine the edge histogram based on the edge type information so that in the edge type histogram at least three edge types with different allocated gradient strengths may be differentiated, wherein the allocator is implemented such that a directional resolution of the allocation with regard to the gradient direction is dependent on the gradient strength.

According to another embodiment, a device for determining an edge histogram of an image based on information about local edge types for a plurality of adjacent image parts of the image may have a weighted edge histogram determiner which is implemented to determine a weighted edge type frequency information describing an occurrence frequency of different local edge types for an image section including a plurality of image parts in order to acquire the edge histogram; wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts.

According to another embodiment, a device for storing an image in an image database may have a device for determining an edge histogram of the image based on information about a gradient strength and a gradient direction of a local gradient in an image content of a partial image of the image which may have an allocator which is implemented to allocate the information on the gradient strength and gradient direction based on an allocation regulation to an edge type to acquire an edge type information, wherein the allocation regulation is selected so that with a given gradient direction at least three different allocated edge types exist mirroring different gradient strengths; and an edge histogram determiner which is implemented to determine the edge histogram based on the edge type information so that in the edge type histogram at least three edge types with different allocated gradient strengths may be differentiated, wherein the allocator is implemented such that a directional resolution of the allocation with regard to the gradient direction is dependent on the gradient strength; and a device for determining an edge histogram of an image based on information about local edge types for a plurality of adjacent image parts of the image, which may have a weighted edge histogram determiner which is implemented to determine a weighted edge type frequency information describing an occurrence frequency of different local edge types for an image section including a plurality of image parts in order to acquire the edge histogram; wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts; and a storing unit for storing the image and the allocated edge histogram in the image database so that a relationship between the image and the allocated edge histogram exists.

According to another embodiment, a device for finding two similar images may have an edge histogram determiner which is implemented to determine a first edge histogram for a first comparative image which may have a device for determining an edge histogram of the image based on information about a gradient strength and a gradient direction of a local gradient in an image content of a partial image of the image, which may have an allocator which is implemented to allocate the information on the gradient strength and gradient direction based on an allocation regulation to an edge type to acquire an edge type information, wherein the allocation regulation is selected so that with a given gradient direction at least three different allocated edge types exist mirroring different gradient strengths; and an edge histogram determiner which is implemented to determine the edge histogram based on the edge type information so that in the edge type histogram at least three edge types with different allocated gradient strengths may be differentiated, wherein the allocator is implemented such that a directional resolution of the allocation with regard to the gradient direction is dependent on the gradient strength; and a device for determining an edge histogram of an image based on information about local edge types for a plurality of adjacent image parts of the image, which may have a weighted edge histogram determiner which is implemented to determine a weighted edge type frequency information describing an occurrence frequency of different local edge types for an image section including a plurality of image parts in order to acquire the edge histogram; wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts; a device for acquiring a second edge histogram of a second comparative image; a similarity information determiner which is implemented to acquire similarity information describing a similarity between an image content of the first comparative image and an image content of the second comparative image, wherein the similarity information determiner is implemented to acquire the similarity information based on a distance measure, wherein the distance measure describes a difference between the first edge histogram and the second edge histogram.

According to another embodiment, a method for determining an edge histogram of an image, may have the steps of acquiring information about a gradient strength and a gradient direction of a local gradient in an image content of a partial image of the image; allocating information about the gradient strength and the gradient direction to an edge type based on an allocation regulation in order to acquire edge type information, wherein the allocation regulation is selected such that with a given gradient direction at least three different allocated edge types exist mirroring the different gradient strengths; and determining the edge histogram based on the edge type information so that in the edge type histogram at least three edge types comprising different allocated gradient strengths may be differentiated, wherein allocating is executed so that a directional resolution of the allocation with respect to the gradient direction is dependent on the gradient strength.

According to another embodiment, a method for determining an edge histogram of an image may have the steps of acquiring information about local edge types for a plurality of adjacent image parts of the image; determining a weighted edge type frequency information describing an occurrence frequency of different local edge types for an image section including a plurality of image parts in order to acquire the edge histogram; wherein, when determining the weighted edge type frequency information, the occurrence of local edge types in image parts belonging to an extensive edge extending across several image parts is weighted higher than the occurrence of local edge types of isolated local edges, wherein the weighting edge histogram determiner is implemented to decide using a comparison of information on local edge types of at least two adjacent image parts whether an image part belongs to an extensive edge.

According to another embodiment, a method for storing an image in an image database may have the steps of determining an edge histogram of the image using a method for determining an edge histogram of an image which may have the steps of acquiring information about a gradient strength and a gradient direction of a local gradient in an image content of a partial image of the image; allocating information about the gradient strength and the gradient direction to an edge type based on an allocation regulation in order to acquire edge type information, wherein the allocation regulation is selected such that with a given gradient direction at least three different allocated edge types exist mirroring the different gradient strengths; and determining the edge histogram based on the edge type information so that in the edge type histogram at least three edge types comprising different allocated gradient strengths may be differentiated, wherein allocating is executed so that a directional resolution of the allocation with respect to the gradient direction is dependent on the gradient strength; and a method for determining an edge histogram of an image, which may have the steps of acquiring information about local edge types for a plurality of adjacent image parts of the image; determining a weighted edge type frequency information describing an occurrence frequency of different local edge types for an image section including a plurality of image parts in order to acquire the edge histogram; wherein, when determining the weighted edge type frequency information, the occurrence of local edge types in image parts belonging to an extensive edge extending across several image parts is weighted higher than the occurrence of local edge types of isolated local edges, wherein the weighting edge histogram determiner is implemented to decide using a comparison of information on local edge types of at least two adjacent image parts whether an image part belongs to an extensive edge; and storing the image and the allocated edge histogram in an image database so that a relationship between the image and the allocated edge histogram exists.

According to another embodiment, a method for finding two similar images may have the steps of determining a first edge histogram for a first comparative image using a method for determining an edge histogram of an image, which may have the steps of acquiring information about a gradient strength and a gradient direction of a local gradient in an image content of a partial image of the image; allocating information about the gradient strength and the gradient direction to an edge type based on an allocation regulation in order to acquire edge type information, wherein the allocation regulation is selected such that with a given gradient direction at least three different allocated edge types exist mirroring the different gradient strengths; and determining the edge histogram based on the edge type information so that in the edge type histogram at least three edge types comprising different allocated gradient strengths may be differentiated, wherein allocating is executed so that a directional resolution of the allocation with respect to the gradient direction is dependent on the gradient strength; and a method for determining an edge histogram of an image, which may have the steps of acquiring information about local edge types for a plurality of adjacent image parts of the image; determining a weighted edge type frequency information describing an occurrence frequency of different local edge types for an image section including a plurality of image parts in order to acquire the edge histogram; wherein, when determining the weighted edge type frequency information, the occurrence of local edge types in image parts belonging to an extensive edge extending across several image parts is weighted higher than the occurrence of local edge types of isolated local edges, wherein the weighting edge histogram determiner is implemented to decide using a comparison of information on local edge types of at least two adjacent image parts whether an image part belongs to an extensive edge; acquiring a second edge histogram for a second comparative image; determining similarity information describing a similarity between image contents of the first comparative image and the second comparative image, wherein the similarity information is determined based on a distance measure, and wherein the distance measure describes a difference between the first edge histogram and the second edge histogram.

According to one embodiment, the present invention provides a device for determining an edge histogram of an image based on information about a gradient strength and a gradient direction of a local gradient in an image content of a partial image of the image. The device includes an allocator which is implemented to allocate the information via the gradient strength and the gradient direction based on an allocation regulation to an edge type in order to obtain edge type information. The allocation regulation is selected such that with a predetermined gradient direction at least three different allocated edge types exist which reflect different gradient strengths. The device further includes an edge histogram determiner which is implemented to determine the edge histogram based on the edge type information, so that in the edge type histogram at least three edge types with different associated gradient strengths may be differentiated.

The above-mentioned embodiment of the present invention is based on the finding that a gradient strength is a main feature in a description of an edge, and that a histogram describing different edge types in the image is especially expressive when in this histogram at least edge types having three different edge strengths may be differentiated. It was thus realized that an image is characterized particularly well by a histogram when basically monochrome areas in which no edges occur and/or which have only a very low edge strength associated with them, areas with a texture in which only weak or medium-strength edges occur, and strongly visible object edgings represented by edge with a high edge strength are differentiated.

In other words, the three different edge strengths differentiated in the generation of the edge type histogram mirror different area types, i.e. basically monochrome areas, textures and object edgings. Thus, the above-described determination of an edge type information enables clearly separating the mentioned area types. For this reason, the edge histogram is especially expressive and enables a differentiation between images having many textures and images having many object borders and/or edgings. Accordingly, the described concept for generating an edge histogram enables an especially reliable database search and/or an especially reliable image comparison based on the edge histogram. Thus, the described concept for determining an edge histogram is applicable in the same way to a plurality of different images, basically independent of the image subject, producing good results.

According to a further aspect, the present invention provides a device for determining an edge histogram of an image based on information about local edge types for a plurality of adjacent image parts of the image. The device includes a weighted edge histogram determiner which is implemented to determine weighted edge type frequency information including an occurrence frequency of different local edge types for an image section including a plurality of image parts in order to obtain the edge histogram. The weighting edge histogram determiner is implemented to weight the occurrence of local edge types in image parts belonging to an extensive edge extending across several image parts higher than the occurrence of local edge types belonging to isolated local edges when determining the weighted edge type frequency information.

The described aspect of the present invention is based on the finding that edge types belonging to clearly visible (spatially) extensive edges carry a special information value. It was found that this fact, which is based on the fact that extensive edges are perceived especially clearly by a user, may be met by an especially strong weighting of the occurrence of the corresponding edge types. It is to be noted that isolated local edges (i.e. short edge sections which are not part of an extensive long edge) typically occur in textures. Thus, typically the isolated local edges (i.e. edges with a length which is smaller than a predetermined threshold length) occupy a very large part of the image with regard to area. Distinct, extensive edges extending across several image parts (i.e., for example, edges whose length is greater than the edge length threshold value), however, only take up a small part of the image with regard to area. This is easy to understand as the extensive edges basically form borders of objects, while the isolated local edges basically occur within the textures of the objects and thus fill in surfaces of the objects. It is plainly obvious that in many images an area occupied by the surfaces is essentially greater than the area occupied by object borders. Thus, in a non-weighted histogram the occurrence of edge types of isolated local edges would dominate. By a corresponding higher weighting of the occurrence of edge types with extensive edges, this imbalance is counteracted. Thus, a balanced edge histogram results which, even in the presence of many isolated local edges, mirrors the edge types of image parts belonging to extensive edges in an adequate way. Thus, the corresponding edge histogram is adapted especially well to human perception and again enables a comparison of images which is adapted especially well to human perception.

According to a further aspect, the present invention provides a further means for determining an edge histogram of an image based on information about local edge types for a plurality of adjacent image parts of the image. The corresponding device includes an edge histogram determiner which is implemented to determine a histogram which combines edge type frequency information for several image parts belonging to a first block of image parts. The edge histogram determiner is further implemented to determine an edge type, to which in the histogram a maximum frequency value is associated, as the block edge type for the first block. Further, the edge histogram determiner is implemented to determine corresponding respective histograms and corresponding respective block edge types for a plurality of further blocks. The edge histogram determiner is further implemented to determine a histogram describing a frequency of different edge types among the block edge types for the different blocks in order to obtain the edge histogram for the image.

The above-mentioned aspect is based on the finding that a block-wise processing of the image leads to low distortion results adapted especially well to the human visual impression when for each block a dominant block edge type for the determination of a further superior histogram is identified. It was thus detected that also a human observer allocates a dominant edge type to different areas of an image and/or document corresponding to the blocks of image parts. In the formation of the superior histogram, describing the frequency of difference edge types among the block edge types, thus non-dominant edge types of every block are left unconsidered. The consideration of the non-dominant edge types in the determination of the superior histogram would generally not contribute to an improvement of the superior histogram, however, but rather means adding a noise-type distortion to the superior histogram. For this reason, in particular omitting the non-dominant edge types by the determination of the block edge type enables keeping interferences within the superior histogram low. Thus, the above-described concept contributes to obtaining an especially reliable edge histogram which is suitable especially well for recognition. As textures and object borders, as already explained above, typically comprise other edge types, the described concept apart from that further enables a clear division of the above-mentioned different edge types by determining a block edge type. Thus, for example, a certain edge type is allocated to a block which enables a conclusion as to whether textures or object borders are dominant in the corresponding block. Also this effect contributes to a further improvement in the quality of the thus formed edge histogram.

According to a further embodiment, the present invention further provides corresponding methods for determining an edge histogram of an image. Apart from that, the present invention provides devices and methods for storing an image and for finding two similar images. The above-mentioned devices and methods in this respect use the above findings and are basically based on the above-described concepts for determining an edge histogram.

Further embodiments of the present invention are defined by the dependent patent claims.

Other features, elements, steps, characteristics and advantages of the present invention will become more apparent from the following detailed description of preferred embodiments of the present invention with reference to the attached drawings.

BRIEF DESCRIPTION OF THE DRAWINGS

In the following, embodiments of the present invention are explained in more detail with reference to the accompanying drawings, in which.

DETAILED DESCRIPTION OF THE INVENTION

FIGS. 1A-1D show a flowchart of a method for determining an edge histogram according to an embodiment of the present invention. The method of FIGS. 1A-1D is designated by 1000 in its entirety. Within the scope of the present description it is assumed that the method 1000 receives an image 1010 as an input variable which exists, for example, in digital form. As an example, the image 1010 may be given as a matrix of pixels, wherein the pixels are arranged in the form of rows and columns. The image 1010 may, however, alternatively also be given in an analog form, for example in the form of continuous electric signals.

Further, apart from that it is assumed that in the image two directions are defined which are referred to in the following as a horizontal direction and a vertical direction. For example, the horizontal direction may run along the rows of the image (i.e. from a first column to a last column). The vertical direction may, for example, run along the columns, i.e., for example from a first row to a last row.

Figure 2A:
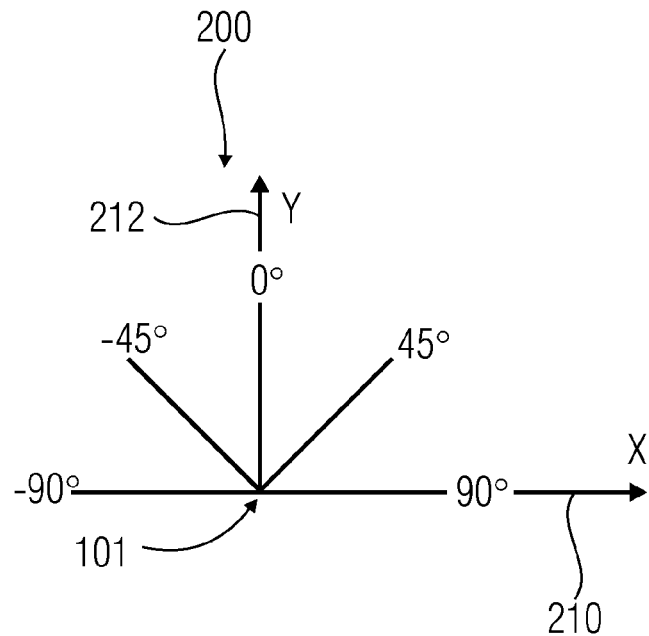
FIG. 2A shows a graphical illustration of an orientation of a gradient angle.
Figure 2B:
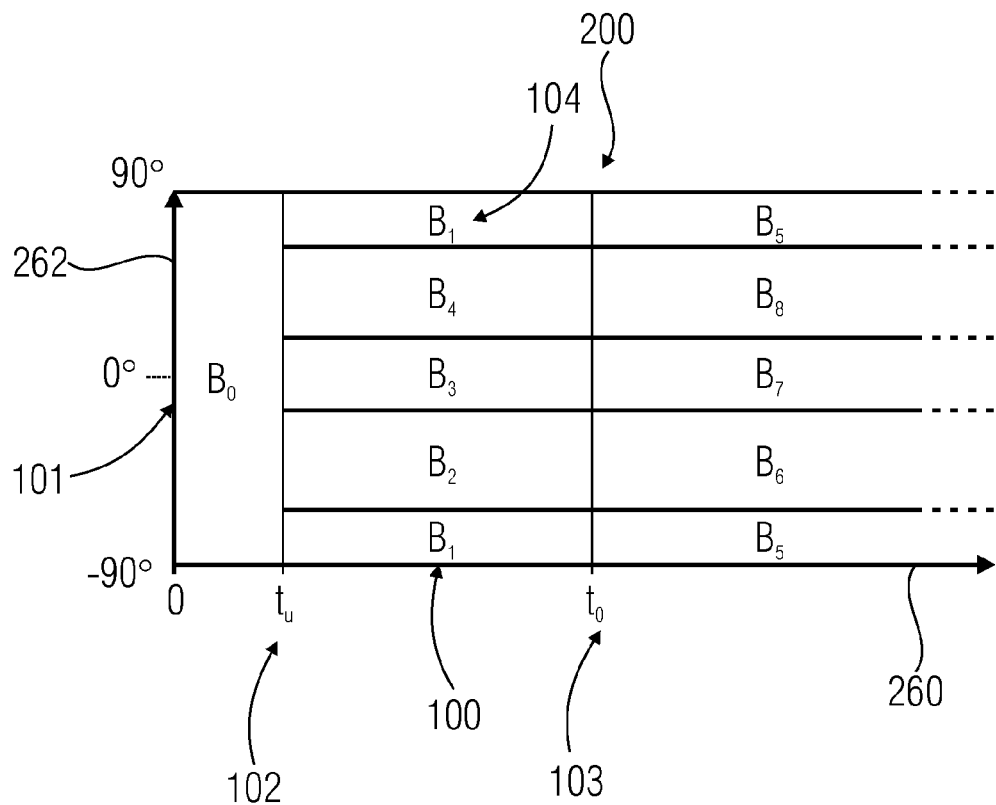
FIG. 2B shows a graphical illustration of a process method when setting up texture edge types by dividing a gradient strength-gradient angle value area into partial areas.
Figure 3:
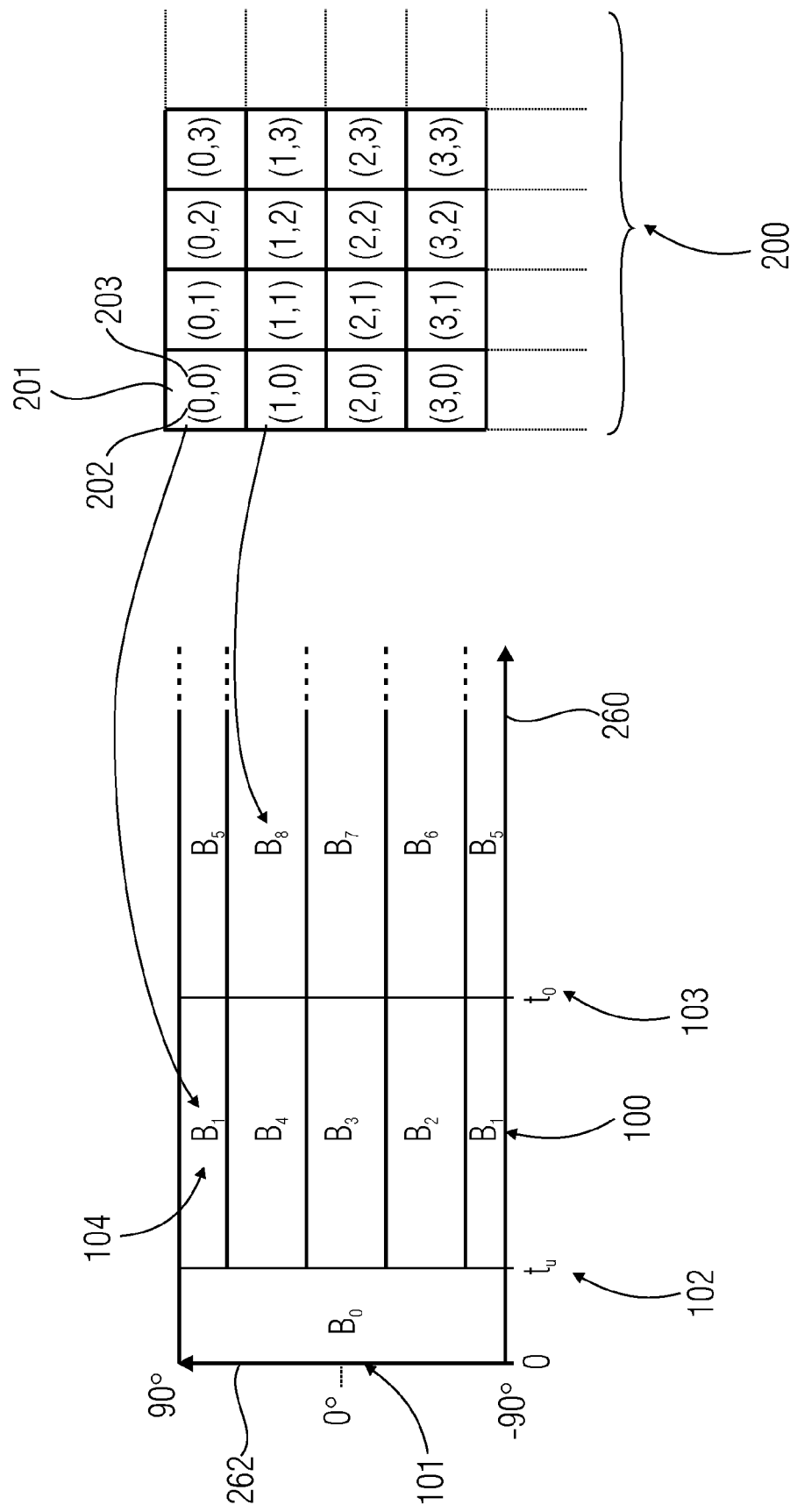
FIG. 3 shows a graphical illustration of an allocation of pixels to a texture edge type.

An illustration of the image in the form of rows and columns is illustrated, for example, in the graphical illustration of FIG. 3. Thus, FIG. 3 shows an image or a digital image 200, respectively. A pixel is designated as an example by 201. Apart from that it is to be noted that in the graphical illustration of FIG. 2 the pixels are designated by two indices. A first index 202 (first value in brackets) describes, for example, starting with zero, a row number of a row in which the pixel is arranged. A second index 203 (second value in brackets) describes, for example, beginning at zero, a row number of a row in which the pixel is arranged.

It is the aim of the method described as an example in the following to gain a histogram which not only describes a local occurrence and a local frequency of edges in an image (for example in the image 1010), but also a local frequency or a size of areas having certain textures, respectively. "Local" means here that the image (for example the image 1010) is divided into rectangles and that for each rectangle the occurrence frequencies of certain textures and edges are determined and illustrated in an over-all histogram.

The determination of this texture-edges histogram or the total histogram, respectively, is executed in several stages, as explained in the following. The method 1010, for example, first of all includes determining a local edge type 1020 with respect to an image part of the image 1010. An image part is, for example, also referred to as a pixel in the following. The image part may, however, also be a larger image section including a plurality of pixels. The method 1000 includes a first step 1032 in which a horizontal gradient with respect to intensity values is determined for an image part (i.e. for example for a pixel) of the image. In a second step 1034, for example a vertical gradient with respect to intensity values is further determined for the image part. In other words, gradients in two directions different to each other with respect to intensity values are determined for an image part of the image. Thus, a first gradient value (for example a value of a horizontal gradient at the location of the image part) and a second gradient value (e.g. a value of a vertical gradient at the location of the image part) is allocated to an image part of the image. In other words, in the first step 1032 and in the second step 1034, for example both gradients in a vertical direction and also gradients in a horizontal direction of the image 1010 are calculated with a horizontal filter operator and a vertical filter operator applied to intensity values of the image pixels.

For the filter operators a Sobel operator or an optimized Sobel operator may, for example, be used which may be applied to the intensity values of the pixels of the digital image. In other words, by applying a first filter operator to the image 1010, for example the horizontal gradient may be determined, and by applying a second filter operator (which is, for example, different from the first filter operator or which may, for example, be rotated with respect to the first filter operator) the vertical gradient may further be calculated. As intensity values $I_{(j,i)}$ for example the brightness values of the pixels but also individual color channels or individual dimensions of color spaces are possible. In the following, an example of a calculation of suitable intensity values $I_{(j,i)}$ is described. Thus, $I_{(j,i)}$ may be calculated according to the equation $$I(j,i) = w_1 \cdot r(j,i) + w_2 \cdot g(j,i) + w_3 \cdot b(j,i),$$

wherein $w_i$ are weighting factors with $$\sum_{1}^{3} w_i = 1$$

wherein 0≤i<image.Width indicates the pixel column in the image and 0≤j<image.Height indicates the pixel row in the image, wherein r(j,i) indicates the red value of the pixel in column i and row j in the RGB format and g(j,i) indicates the green value of the pixel in column i and row j in the RGB format and K0 indicates the blue value of the pixel in column i and row j in the RGB format.

With $w_i = \frac{1}{3}$ for i=1, . . . , 3, the brightness value is expressed by I(j,i).

$I_{(j,i)}$ may also be represented as a weighted sum of components from other color spaces, like, e.g., the HSV color space, for example according to $$I(i,j) = w_1 \cdot h(j,i) + w_2 \cdot s(j,i) + w_3 \cdot v(j,i),$$

wherein w(i) are weighting factors, 0≤i<image.Width indicates the pixel column in the image, 0≤j<image.Height indicates the pixel row in the image, h(j,i) indicates the hue of the pixel in column i and row j in the HSV color space, s(j,i) indicates the color saturation value of the pixel in column i and row j in the HSV color space and v(j,i) indicates the brightness value of the pixel in column i and row j in the HSV color space.

As a filter operator, for example, a Sobel operator $S_x$ or $S_y$, respectively, may be used, for example according to $$S_x = \begin{bmatrix} -1 & 0 & 1 \\ -2 & 0 & 2 \\ -1 & 0 & 1 \end{bmatrix} \text{ and } S_y = \begin{bmatrix} -1 & -2 & -1 \\ 0 & 0 & 0 \\ 1 & 2 & 1 \end{bmatrix}.$$

Alternatively, an optimized Sobel operator $S_x^{opt}$ and/or $S_y^{opt}$ may be used, for example according to $$S_x^{opt} = \begin{bmatrix} -3 & 0 & 3 \\ -10 & 0 & 10 \\ -3 & 0 & 3 \end{bmatrix} \text{ and } S_y^{opt} = \begin{bmatrix} -3 & -10 & -3 \\ 0 & 0 & 0 \\ 3 & 10 & 3 \end{bmatrix}.$$

An application of the horizontal and vertical Sobel operator or the optimized Sobel operator, respectively, to the overall image leads to the horizontal gradient according to $$G_x = I * S_x \text{ or } G_x = I * S_x^{opt},$$

depending on whether the horizontal Sobel operator $S_x$ or the optimized Sobel operator $S_x^{opt}$ is used, and leads to the vertical gradient $G_y$ according to $$G_y(j,i) = I(j,i) * S_y \text{ or } G_y(j,i) = I(j,i) * S_y^{opt},$$

depending on whether the vertical Sobel operator $S_y$ of the optimized vertical Sobel operator $S_y^{opt}$ is used.

In this respect it is to be noted that the application of the Sobel operators to the first column and to the last column and/or to the first row and to the last row is not directly possible. Instead, here (i.e. in the first row and in the last row, and in the first column and in the last column) the corresponding values for the gradient are set, for example, to zero.

In summary it may thus be said that the horizontal gradient may be obtained as a locally (with regard to the rows and columns) variable function by folding the image 1010 with a horizontal Sobel operator and/or an optimized horizontal Sobel operator. In this respect, it is moreover to be noted that for each pixel position (with the exception of pixels along the image borders) a local gradient value may be calculated. For the calculation of a local gradient value at a pixel position, for example pixels are involved which are arranged in an environment of the corresponding pixel position and/or surround the corresponding pixel position.

Thus, a local gradient value for an image part and/or for a pixel position is a gradient value which was determined using the image parts surrounding the corresponding image part and/or using the pixel positions surrounding the pixel position.

Apart from that, it may also be noted in summary that the vertical gradient may be obtained, for example, by folding the image 1010 with a vertical Sobel operator and/or an optimized vertical Sobel operator.

Thus, in one embodiment of the present invention, for example for each pixel position (or allocated to each image part) one value of a horizontal gradient $G_x(j,i)$ and one value of a vertical gradient $G_y(j,i)$ is available.

It is sufficient, however, if the corresponding values of the horizontal gradient and the vertical gradient for pixel positions and/or for image parts are available which are further processed in the following. The fact that, apart from that, gradient values of pixel positions and/or of image parts along the image border may not be calculated precisely (but only be calculated approximately and/or set to zero) is no substantial problem here.

Apart from that, it is to be noted that it is not important for the embodiment described how accurately the value for the horizontal gradient and the value for the vertical gradient are calculated. Thus, Sobel operators other than those illustrated may be used, or also a completely different concept for calculating gradients (for example with regard to the intensity values $I(j,i)$) may be used.

Apart from that, it is to be noted that within the present description i and j each describe pixel positions, for example, wherein i, for example, designates a pixel column and wherein j, for example, designates a pixel row in the image. Alternatively, i and j may, however, also generally designate a position of image parts in the image.

Figure 1A:
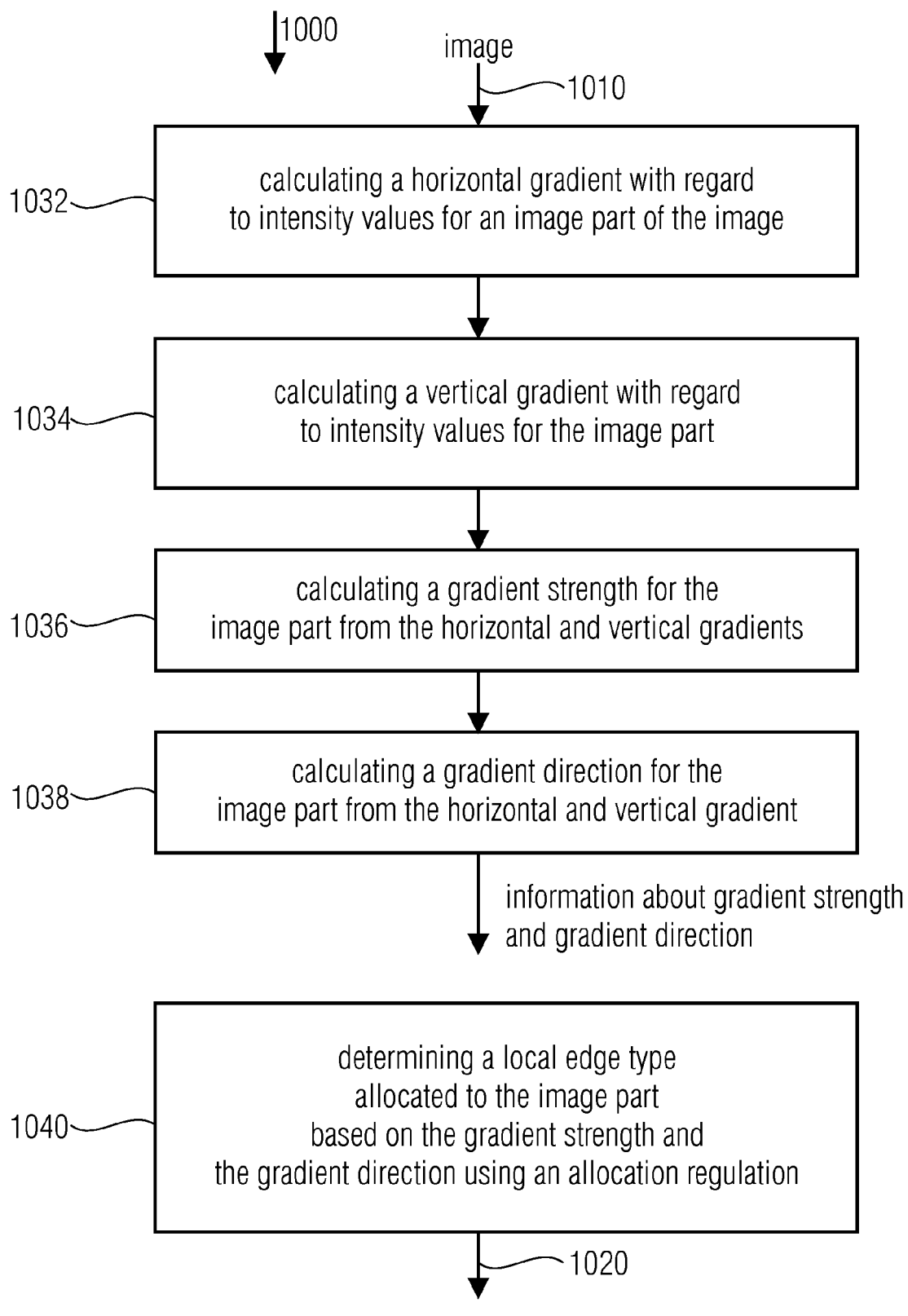
FIGS. 1A to 1D shows a flowchart of a method for determining an edge histogram according to an embodiment of the present invention.

With regard to FIG. 1A, the method 1000 includes in a third step 1036 calculating a gradient strength 100 for the image part (or for the corresponding pixel) from the horizontal gradient and the vertical gradient. Further, in a fourth step 1038, the method 1000 includes calculating a gradient direction and/or a gradient angle 101 for the image part or for the corresponding pixel from the horizontal gradient and the vertical gradient. In other words, in steps 1036, 1038 very generally a calculation of a gradient strength 100 and a gradient angle 101 describing a gradient direction is executed for each pixel in the image 1010 (or at least for a plurality of pixels) from the horizontal gradient $G_x$ and the vertical gradient $G_y$. For illustrating the gradient direction or the gradient angle, respectively, reference is made to FIG. 2A. FIG. 2A shows a graphical illustration of an orientation of the gradient angle. The graphical illustration according to FIG. 2A is designated by 200 in its entirety. FIG. 2A shows a coordinate system defined by an x axis 210 and by a y axis 212. The x axis 210 corresponds, for example, to a horizontal direction, while the y axis 212 corresponds to a vertical direction. Further, different angles are plotted into the coordinate system. In this respect it is to be noted that a gradient angle of 0° corresponds, for example, to a vertical edge. A gradient angle of 45° corresponds, for example, to a diagonally rising edge. A gradient angle of −45° corresponds, for example, to a diagonally falling edge. A gradient angle of 90° and/or of −90° corresponds, for example, to a horizontal edge. In this respect it is to be noted that typically the gradient direction is vertical to the course of the edge, as the gradient direction and/or the gradient angle describe the direction of the steepest intensity change. One edge, however, is basically vertical to the direction of the change of the intensity.

In the following, it will be described how both the gradient strength and also the gradient angle may be calculated on the basis of the gradient values of the horizontal gradient and the vertical gradient. Thus, for example, the gradient strength may be calculated by calculating the standard based on the horizontal gradient value and the vertical gradient value. In other words, the horizontal gradient value and the vertical gradient value are, for example, regarded as components of a vector, wherein the gradient strength is then the amount and/or the length of the corresponding gradient vector. The gradient strength $G(j,i)$ for a pixel $(j,i)$ and/or for an image part with the indices $(j,i)$ may, for example, be calculated according to the following formula:

$$G(j,i)=\sqrt{G_x^2(j,i)+G_y^2(j,i)} \text{ for pixel } (j,i)$$

Alternatively, the gradient strength $G(j,i)$ may be calculated for the pixel having the indices $(j,i)$ and/or for an image part having the indices $(j,i)$ according to the following equation:

$$G(j,i)=|G_x(j,i)|+|G_y(j,i)| \text{ for pixel } (j,i).$$

In the following, a further example of the calculation of the gradient direction or the gradient angle, respectively, as executed in the fourth step 1038 is described. If the horizontal gradient value $G_x(j,i)$ and the vertical gradient value $G_y(j,i)$ for a pixel $(j,i)$ and/or for an image part $(j,i)$ are known, the gradient angle for each pixel (and/or for a plurality of pixels) may, for example, be determined according to the following calculation regulation:

$$\alpha(j,i) = 0° \quad \text{if } G_x(j,i) = 0, G_y(j,i) = 0$$
$$\alpha(j,i) = 90° \quad \text{if } G_x(j,i) = 0, G_y(j,i) \neq 0$$
$$\alpha(j,i) = \arctan\left(\frac{G_y(j,i)}{G_x(j,i)}\right) \text{ if } G_x(j,i) \neq 0$$

The gradient angle or the gradient direction, respectively, belonging to the pixel position $(j,i)$ or to the image part with the indices $(j,i)$, respectively, is designated here by $\alpha(j,i)$. Arctan designates an arcus tangens function.

According to the above-indicated calculation regulation, the gradient angle $\alpha(j,i)$ thus lies in a range between −90° (not included) and 90° (included) (see FIG. 2B).

In the above-described way, to each pixel (or image part) at the position $(j,i)$ of the image 1010 exactly one value for the gradient strength $G(j,i)$ and exactly one value for the gradient angle $\alpha(j,i)$ is allocated. The orientation of different gradients angles is, as described above, illustrated in FIG. 2A.

In summary it is to be noted that in the first four steps 1032-1038 of the method 1000 information about a gradient strength (for example designated by the gradient strength $G(j,i)$) and a gradient direction (for example described by the gradient angle $\alpha(j,i)$) was determined. In this respect it is noted that also other methods for the calculation of gradient strength and gradient direction which were not described here may be used. For example, the image 1010 may be processed using at least three filter operators oriented in different directions. Thus, for example, for a certain pixel position and/or for a certain position of an image part (for example designated by indices $(j,i)$) three or more filter values may exist, wherein, for example, a first filter value is formed by applying a horizontally oriented filter, wherein, for example, a second filter value is formed by the application of a vertically oriented filter, and wherein, for example, a third filter value is formed by the application of a diagonally (for example at an angle of 45°) oriented filter. If, for example, three such filter values exist, also these three filter values include information about a gradient strength or a gradient direction, for example. Thus, the direction is, for example, determined by which of the mentioned three or more filter values is highest. The gradient strength is then defined, for example, by the highest filter value or by a combination of the filter values. In general, information about a gradient strength and a gradient direction is thus every information, independent of the concrete form of the illustration, from which the gradient strength and the gradient direction may be derived.

It is described in the following how, from the information about the gradient strength and the gradient direction obtained, for example, using steps 1032-1038, or which may also be obtained, for example, in another way, a local edge type for an image part is determined. The method 1000 includes for this purpose in a 5$^{th}$ step 1040 the determination of a local edge type allocated to the image part or the pixel, respectively, based on the gradient strength and the gradient direction. Here, an allocation regulation is used. Thus, information 1020 about a local edge type results for an image part or for a pixel, respectively.

Details with regard to executing the 5$^{th}$ step 1040 are explained in more detail in the following. Here, among others reference is made to FIGS. 2B and 3. FIG. 2B shows a graphical illustration describing a setup of texture edge types by dividing the gradient strength/gradient angle value range into partial areas. Further, FIG. 3 shows a graphical illustration of an allocation of pixels to texture edge types.

In this respect it is first of all noted that the gradient strength and the gradient direction or the gradient angle, respectively, together determine whether a pixel (or image part) belongs to an edge, is part of a fine structure or also part of a structureless area. To execute this characterization of a pixel, in one embodiment of the present invention a division of the two-dimensional value range of the gradient strength and the gradient direction or the gradient angle, respectively, is executed. This type of division (when using the method in connection with an identification or a search of images) leads to better search results. For example, using the described division better search results result than is possible using an edge histogram as is described in U.S. Pat. No. 6,807,298 B1.

With respect to the above descriptions, it is assumed in the following that the value range for the gradient strength G lies in a range between zero and infinite. In a real embodiment, however, the value range for the gradient strength is, of course, limited upward. It is further assumed that the value range for the gradient angle lies in a range between −90° (not included) and +90° (included). The value range of a two-dimensional tuple (G,α)(j,i) is accordingly described by the following relation:

$$(G,\alpha) \in [0,\infty) \times (-90°, 90°] = W$$

In other words, in an idealized representation the gradient strength may take on non-negative, real values. The gradient angle varies according to an definition used here from −90° (not included) to 90° (included). The corresponding circumstance is, incidentally, also illustrated in FIG. 2B. For this purpose, FIG. 2B shows a graphical illustration of a plane of numbers. The graphical illustration is designated by 250 in its entirety. In a first direction, described by a first axis 260, the gradient strength is plotted. In a second direction, designated by a second axis 262, the gradient angle is plotted on a value range between −90° and +90°. The value range W is, for example, as illustrated in FIG. 2B, divided into different partial areas. The division is, for example, into disjunct partial areas which, however, (altogether) cover the complete value range.

The division is based on the following finding: it turned out in examinations that in particular edges clearly visible in images, like, for example, a silhouette or a skyline, or edges of buildings or objects, have a high gradient strength, while areas with fine textures, like, for example, water surfaces, treetops or clouds, are designated by pixels with an average gradient strength. Smooth areas or areas with weak textures distinguish themselves by pixels with a low gradient strength.

Based on these findings, the value range W is divided into three areas with regard to the gradient strength G, which are illustrated in FIG. 2B. In this respect, for example two threshold values $t_u$ (also designated by 102) and $t_o$ (also designated by 103) are introduced with $0 < t_u < t_o$. The two threshold values $t_u$ and $t_o$ are, for example, set such that the following visual classification may be made:

| | |
|---|---|
| $0 \leq G(j, i) < t_u$: | pixel belongs to a monotonous area without texture; |
| $t_u \leq G(j, i) < t_o$: | pixel belongs to an area with a texture; |
| $t_o \leq G(j, i)$: | pixel is part of a clearly visible edge. |

Apart from that, it is to be noted that the value range W, as illustrated in FIG. 2B, is, for example, divided into nine individual areas $B_0$-$B_8$. If one gradient strength is smaller than the first threshold value $t_u$, then the edge type $B_0$ is allocated to a tuple (G,α) independent of the gradient angle α.

An area of an average gradient strength (in which $t_u < G > t_o$) and higher gradient strength (with $t_u < G$) which represents textures and edges is divided into further partial areas with regard to the gradient angle α. One example of such a division is the following:

| | |
|---|---|
| $|α(j, i)| < 22.5°$: | pixel is part of a vertical edge; |
| $|α(j, i)| > 67.5°$: | pixel is part of a horizontal edge; |
| $22.5° \leq α(j, i) \leq 67.5°$: | pixel is part of a (rising) diagonal edge; |
| $-67.5° \leq α(j, i) \leq -22.5°$: | pixel is part of a (falling) diagonal edge. |

In other words, with an average and higher gradient strength, an edge type is allocated to a first angle range (for example between −22.5° and +22.5°) which describes the presence of a vertical edge. To a second angle range (for example with $|α(j,i)| > 67.5°$ for example a further corresponding edge type is allocated which indicates that a pixel or image part is part of a (local) horizontal edge.

Corresponding edge types are allocated to further value ranges of the gradient angle which indicate that the pixel or image part is part of a rising or falling diagonal (local) edge.

A combination of the above-described divisions of the value range W into individual partial ranges $B_0$-$B_8$ to which corresponding edge types are allocated results, for example, in the following nine partial areas (also designated by 104) of the value range B:

| | | |
|---|---|---|
| $B_0$: | $[0, t_u) \times (-90°, 90°]$ | area without texture or edges; |
| $B_1$: | $[t_u, t_o) \times ((-90°, -67.5°) \cup (67.5°, 90°])$ | horizontal texture; |
| $B_2$: | $[t_u, t_o) \times [-67.5°, -22.5°]$ | diagonal (falling) texture; |
| $B_3$: | $[t_u, t_o) \times (-22.5°, 22.5°)$ | vertical texture; |
| $B_4$: | $[t_u, t_o) \times [22.5°, 67.5°]$ | diagonal (rising) texture; |
| $B_5$: | $[t_o, \infty) \times ((-90°, -67.5°) \cup (67.5°, 90°])$ | horizontal edge; |
| $B_6$: | $[t_o, \infty) \times [-67.5°, -22.5°]$ | diagonal (falling) edge; |

-continued

| | | |
|---|---|---|
| $B_7$: | $[t_o, \infty) \times (-22.5°, 22.5°)$ | vertical edge; |
| $B_8$: | $[t_o, \infty) \times [22.5°, 67.5°]$ | diagonal (rising) edge. |

In the enumeration, for each of the areas $B_0$-$B_8$ it is indicated to which edge type ("area without texture and edges", "horizontal texture", "diagonal (falling) texture", "vertical texture", "diagonal (rising) texture", "horizontal edge", "diagonal (falling) edge", "vertical edge", "diagonal (rising) edge") the respective area $B_0$-$B_8$ is mapped or to which edge type the respective area $B_0$-$B_8$ is allocated. The mentioned edge types may, for example, be designated by a numerical edge type identifier.

The above listing is to be regarded as follows: if a tuple $(G(j,i), \alpha(j,i))$ is in the range $B_k$, the edge type k is allocated to the corresponding pixel and/or image area (j,i).

It is to be noted that also other divisions of the value range W and/or another allocation between a tuple $(G,\alpha)$ and an edge type may be selected. With an increase in gradient strength G, merely with respect to perceptual physics, the gradient angle gains ever more importance. Thus, for example, an area with higher gradient strengths (for example with $G > t_o$) representing edges in the image 1010 may also be divided into eight partial areas (instead of four partial areas). This has the consequence, however, that a texture-edge histogram to be explained in more detail in the following grows regarding its number or regarding the number of the histogram values (as then more and more different edge types exist). Thus, it may all in all be noted that the different partial areas $B_K$ with $0 \leq k \leq 8$ each represent a certain texture-edge type (also designated by 104).

In this respect it is to be noted explicitly that the area $B_0$, i.e. the area with the lower edge strength, represents an area without texture and edges. The areas $B_1$-$B_4$ with an average edge strength represent textures with different texture directions. The areas $B_5$-$B_8$ with a (comparatively) high edge strength (greater than $t_o$) further represent edges with different edge directions. It is to be noted here, however, that both areas without texture and edges, textures and edges in general are regarded as "edges" or local edges, respectively, to which accordingly a local edge type is allocated. In other words, a texture is regarded as an edge with a weaker edge strength (compared to z of a real edge) and an area without texture and edges is regarded as an edge with a very low edge strength (weaker than with a texture).

All in all it may, apart from that, be noted that, to each pixel of the image, via a gradient strength allocated to the same and a gradient angle allocated to the same, exactly one partial area $B_k$, for example with $0 \leq k \leq 8$, and thus a definite texture edge type (also referred to as edge type and referenced by 104 in FIG. 3) may be allocated. In the following, for example, pixels are represented by their texture edge type 104.

The texture edge type 104 is incidentally also referred to as a local edge type 1020 for an image part or for a pixel, respectively.

In the following, it is assumed, apart from that, that local edge types 1020 are determined for a plurality of image parts or for a plurality of pixels, respectively. In one embodiment of the present invention, both across the total image and also across certain rectangular areas of the image histograms are formed which indicate the frequency of the texture edge types of the pixels contained therein. From this, an overall histogram may be formed. The mentioned procedure may basically be applied, however does not lead to optimal results, because in this way the characteristics of the individual image parts or pictures, respectively, are regarded individually. Edges and textures are, however, the result of an accumulation of adjacent pixels with certain characteristics. Thus, for example, a horizontal edge only becomes a clearly visible horizontal edge when in a horizontal direction adjacent pixels also have the edge characteristic of a horizontal edge. In order to consider this fact, in one embodiment of the present invention, the texture edge types in the image are detected block-wise, as is described in the following.

Figure 1B:
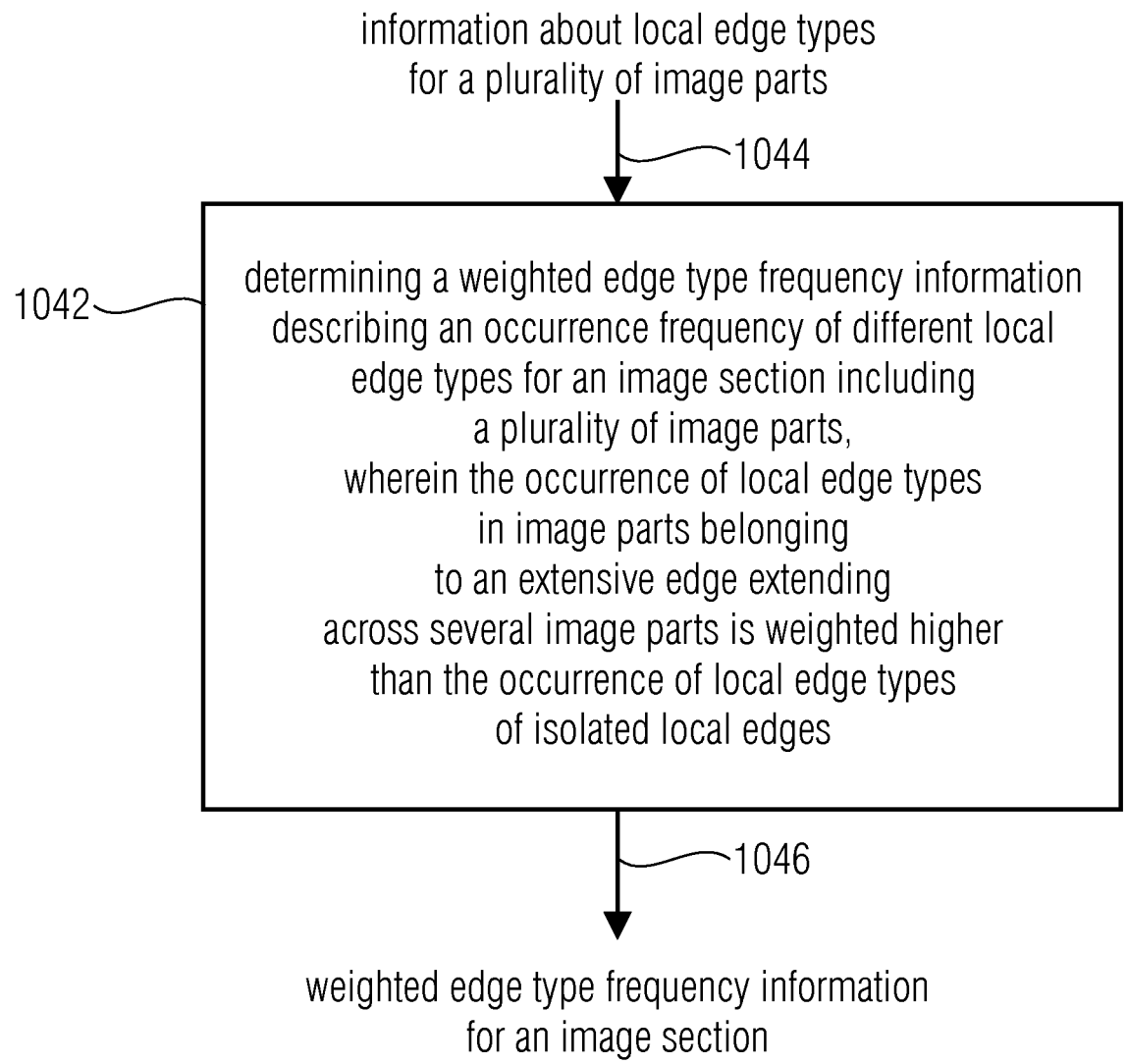
Figure 1C:
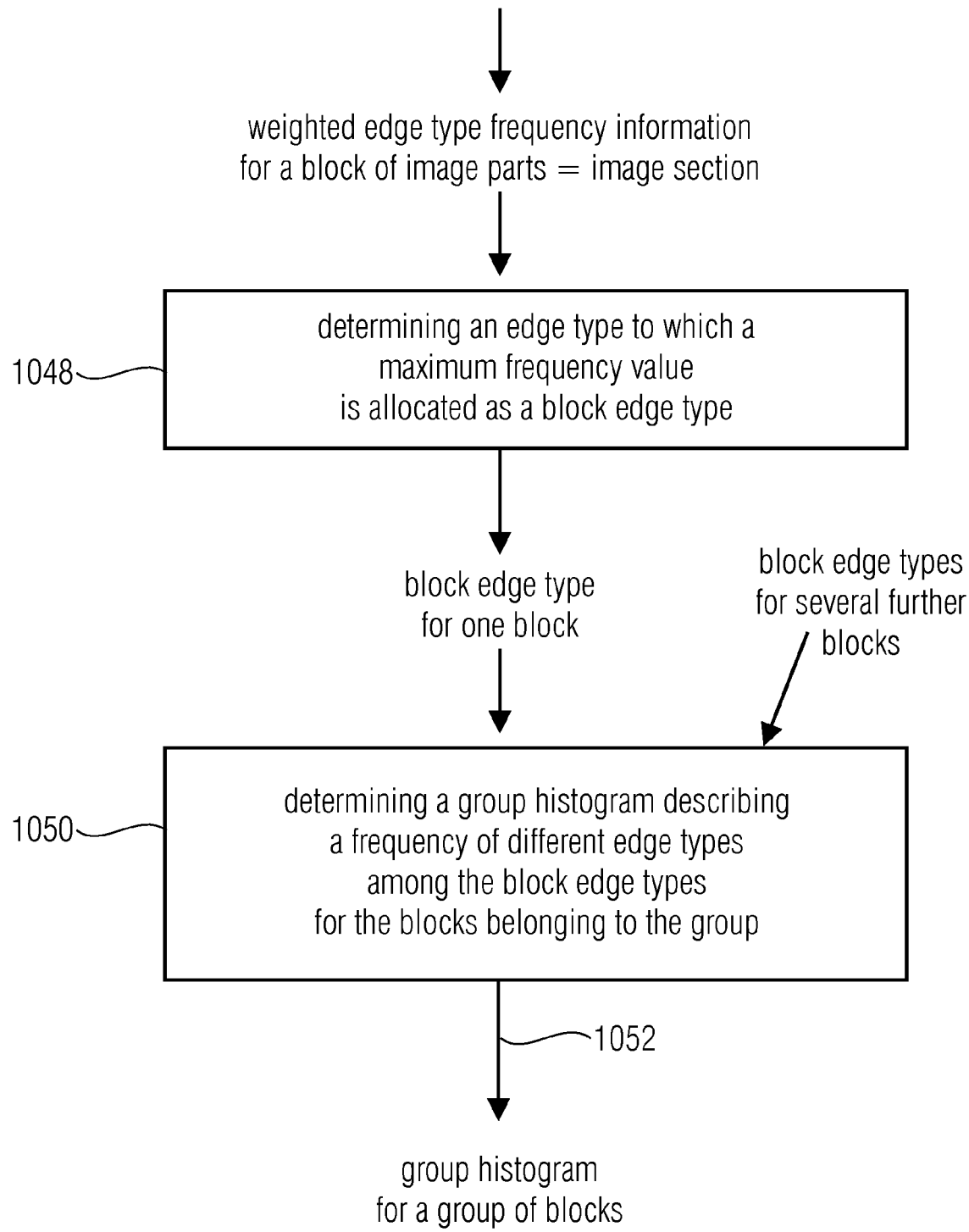
Figure 1D:
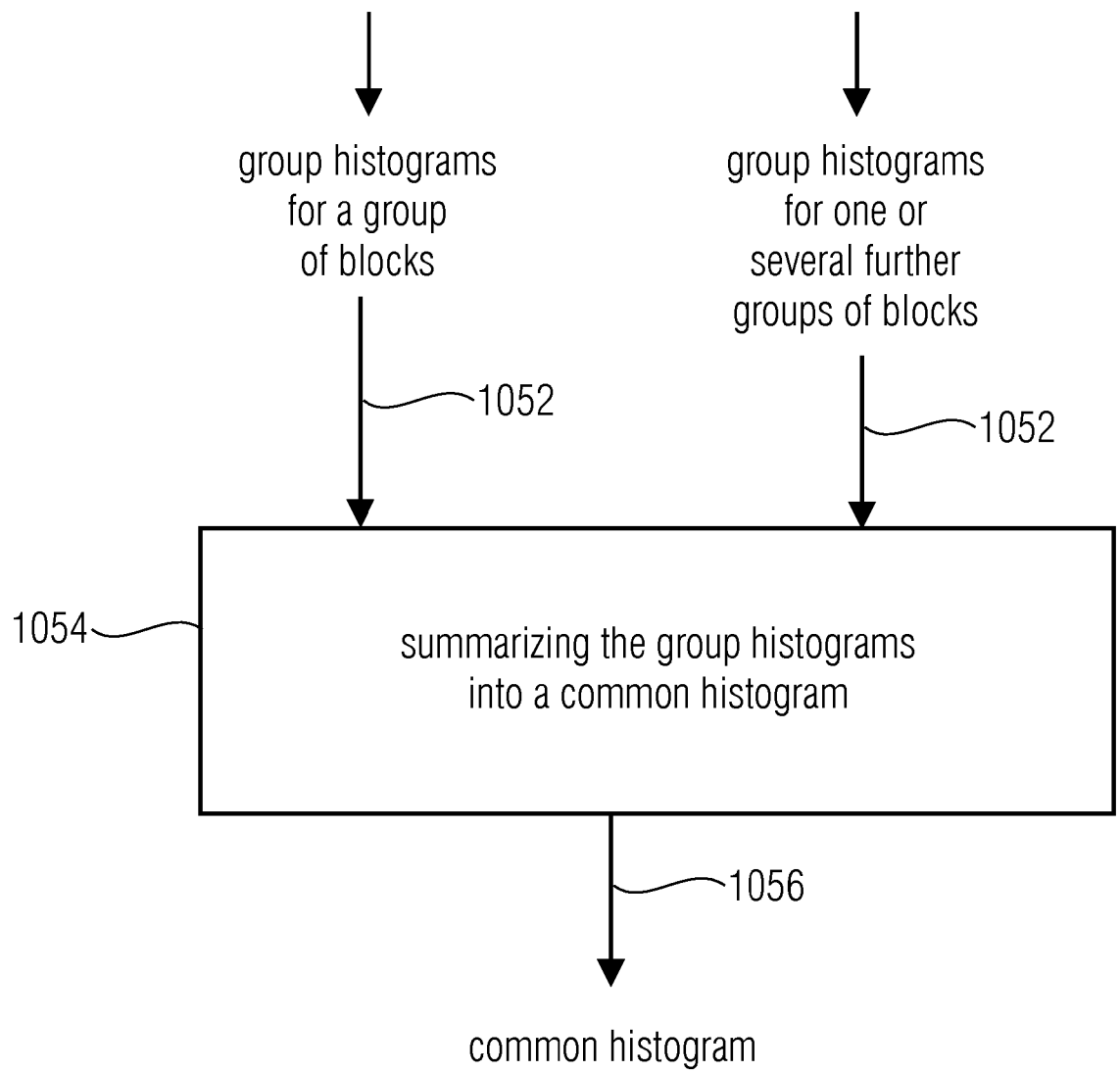

Thus, the method 1000 according to FIGS. 1A-1D, after executing the $5^{th}$ step 1040, is continued by the $6^{th}$ step 1042 which is illustrated in FIG. 1B. Based on information 1044 about local edge types for a plurality of image parts, in the $6^{th}$ step 1042 a weighted edge type frequency information 1046 for an image section is determined. An image section here includes a plurality of image parts, i.e., for example, a plurality of pixels. A corresponding image section is also partially describes as a "block" within the present description. The $6^{th}$ step 1042 includes determining a weighted edge type frequency information describing a frequency of occurrence of different local edge types for an image section including a plurality of image parts. The occurrence of local edge types in image parts belonging to an extensive edge extending across several image parts is here weighted higher than the occurrence of local edge types of isolated local edges.

In other words, edge type frequency information is determined which indicates, for the different possible edge types (for example in the form of a histogram representation), how often the corresponding edge types occur in the image parts belonging to the image section. Here, however, not every occurrence of a certain edge type is necessarily counted once. Rather, the occurrence of an edge type in an image part belonging to an extensive edge extending across several image parts is counted as being weighted higher (i.e. more than once, for example twice, weighted and counted). By this, as already explained above, spatially extensive edges extending across several (for example adjacent) image parts are weighted especially strongly in the formation of the weighted edge type frequency information.

Figure 4:
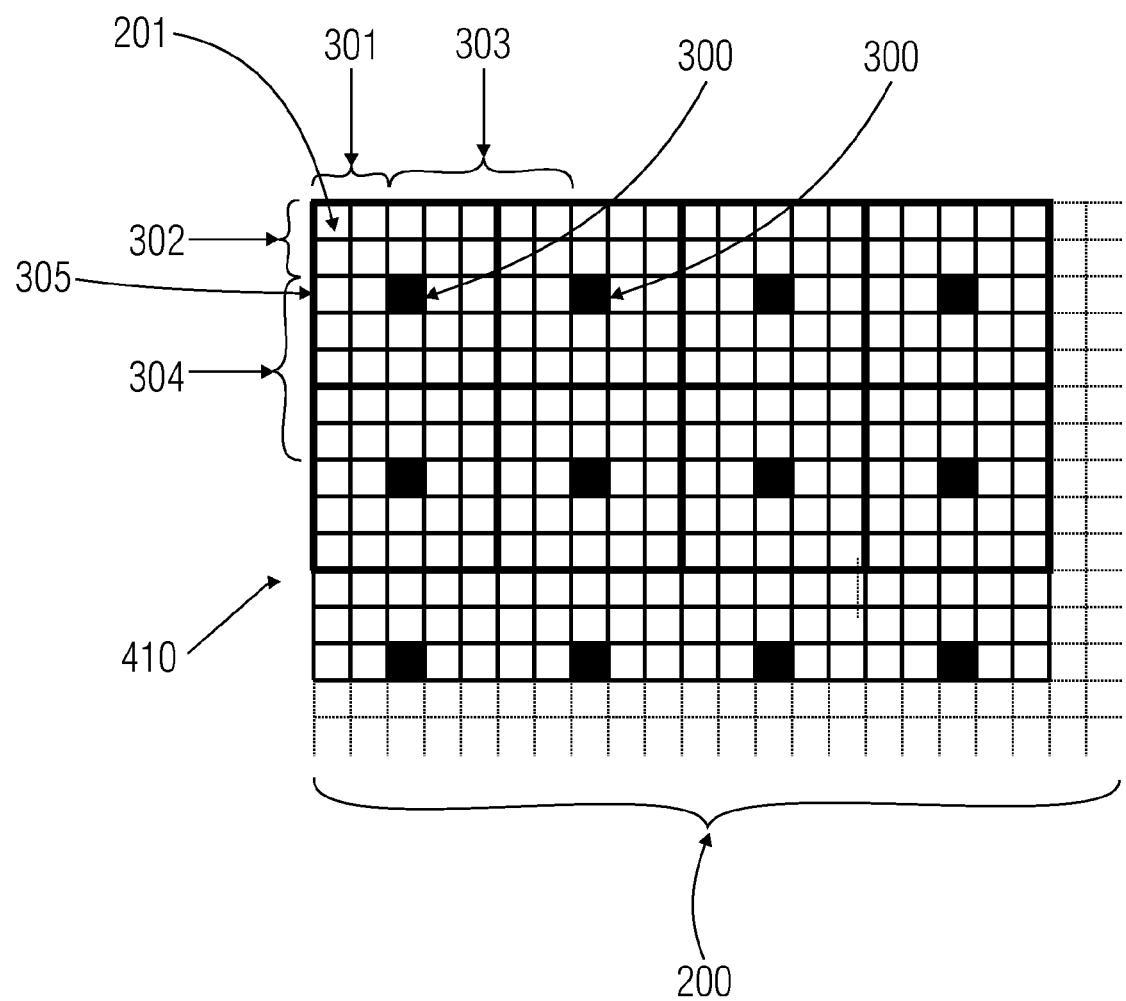
FIG. 4 shows a graphical illustration of a grid with blocks.

In the following, it is explained with reference to FIGS. 4, 5A and 5B how the weighted edge type frequency information 1046 may be gained. In this respect, FIG. 4 shows a graphical illustration of a grid with blocks. The graphical illustration of FIG. 4 is designated by 400 in its entirety. The graphical illustration 400 shows a grid 410. The grid may, for example, define an arrangement of image points, or pixels, wherein one pixel is designated by 201.

In a possible (optional) method step, a two-dimensional grid 410 consisting of grid points 300 is put across the image. This is illustrated in the graphical illustration of FIG. 4. Starting at a starting pixel determined by an offset both in a horizontal (301) and also an offset in a vertical direction (302), for example in fixed increments both in a horizontal (303) and also in a vertical direction (304) pixels are selected as grid points. The pixel coordinates of a two-dimensional (selected) grid point GP $(j_G, i_G)$ (also designated by 300) may, for example, be determined as follows:

$$GP(j_G, i_G) = (\text{offset}_y + j_G \cdot d_y, \text{offset}_x + i_G \cdot d_x)$$

Around each of the mentioned grid points, for example, (optionally) a square block 305 of pixels is laid such that a center point of the block coincides with the grid point 300. Ideally, the block has an odd side length of pixels. FIG. 4 shows the block formation. The offset 301, 302 in the grid 410 is, for example, selected such that also around the first row and around the first column of the grid points 300 a complete block may be laid. In the same way, the grid points of the last row and/or the last column should be defined such that a complete block can still be laid around same.

The increments and/or step widths $d_x$ (also designated by 303) and $d_y$ (also designated by 304) should ideally be selected as large as the side length of the blocks 305 to guarantee a complete coverage of the image with blocks and to minimize the number of the blocks. The increments may also be selected smaller, which leads to more blocks, but also to a higher analysis effort.

For the coordinates ($j_G$, $i_G$) of a grid point, for example the following possible value range results:

$$0 \le j_G < (int)((image.Height-block.Height+1)/d_y);$$

$$0 \le i_G < (int)(image.Width-block.Width+1)/d_x).$$

Here, block.Width designates the width of the block (for example in a horizontal direction) and block.Height the height of the block (for example in a vertical direction) in pixels. (int) refers to the "integer value of the quotient". Each block is unambiguously defined by the indication of the grid point by the two coordinates ($j_G$, $i_G$).

It was explained in the above description how an advantageous division of an image (e.g. of the image 1010) into a plurality of blocks may be achieved. The blocks were, for example, selected such that the blocks cover the image both in a horizontal direction and also in a vertical direction without gaps and without overlapping each other. The block is here identified unambiguously by two indices $j_G$ and $i_G$. It is to be noted, however, that the blocks of image parts (e.g. blocks of pixels) into which the image 1010 is divided may also be selected in another way. Thus, the blocks into which the image 1010 is divided may, for example, be predefined. The blocks of pixels may, apart from that, be overlapping or non-overlapping. It is further possible that gaps between two adjacent blocks exist. For understanding the following description, it is only important that the image comprises at least one block of image parts or one block of pixels, respectively, wherein the block of image parts or the block of pixels, respectively, includes a plurality of pixels. It is further advantageous that a block of pixels defines a plurality of adjacent pixels forming a continuous pixel area. This is not necessarily requested, however. Further, the processing is simplified if a block of pixels defines a square of rectangular image section. This is also not absolutely requested, however. If thus a block of pixels and/or an image section is defined, a subsequent method step (for example the sixth step 1042) consists in calculating texture edge type frequencies for each block (or at least for one block or for a plurality of blocks). Here, for each pixel of the block an (allocated) texture edge type 104 is determined, for example (but not necessarily) using the steps 1032 to 1040, and from this, for the complete block the weighted frequencies 401 of the texture edge types occurring—in the described example: 9—are calculated (see FIG. 5A).

The weighting of the texture edge types has the following background: edges as compared to textures only occupy little area but are perceived more intensively. This is the reason why pixels which are part of an edge and not part of a texture, i.e. pixels which, for example, belong to the texture edge types $B_5$ to $B_8$ in one embodiment have a higher weighting. To further guarantee that the corresponding pixel is really part of an edge, for example a higher weighting, e.g. with a weighting factor of 2 (see reference numeral 400), is used (or only when) when the pixels adjacent in the edge direction are also of the same texture edge type. FIG. 5B represents this for four edge types.

Figure 5A:
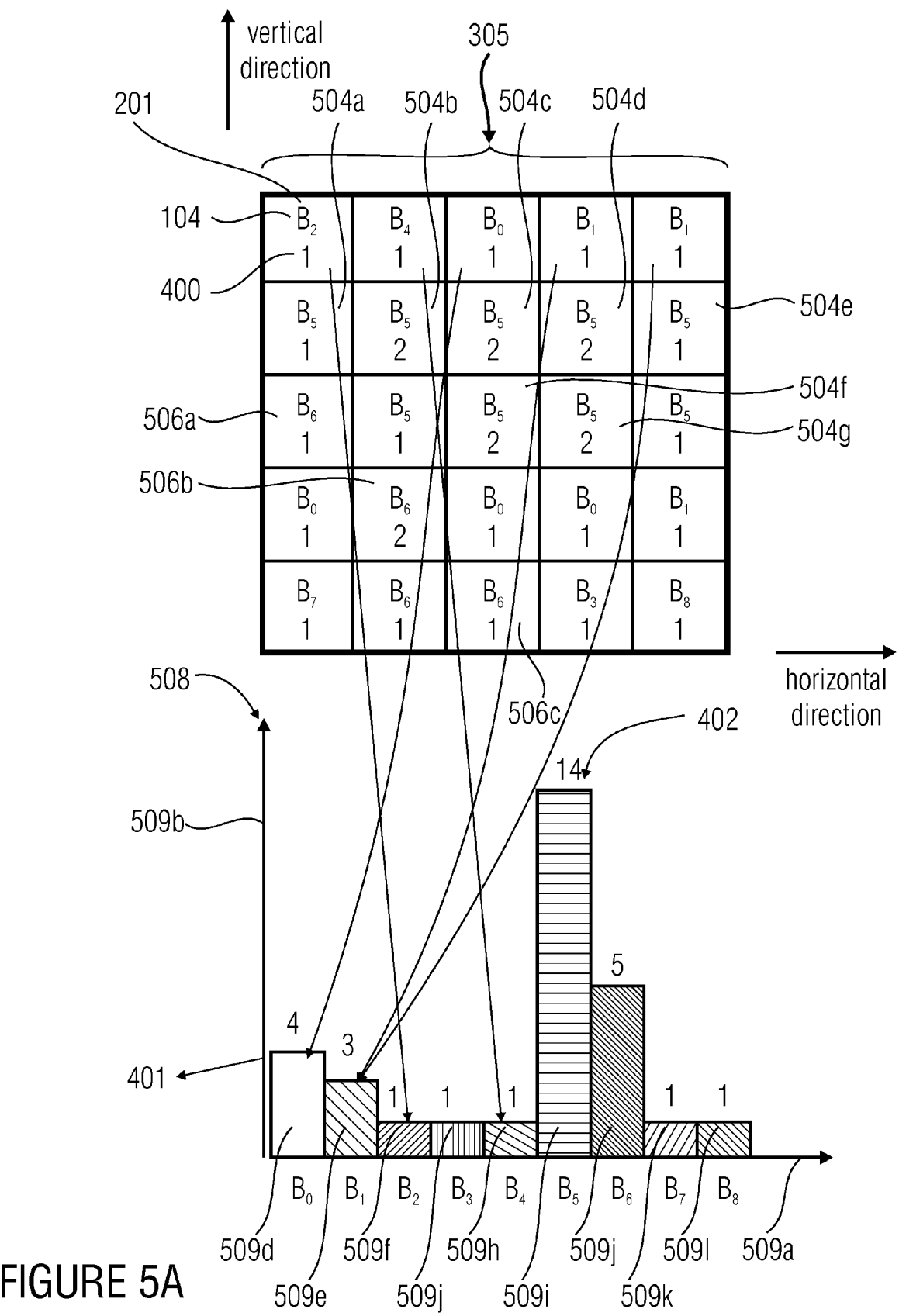
FIG. 5A shows a schematical illustration showing a determination of a texture edge type for a block.
Figure 5B:
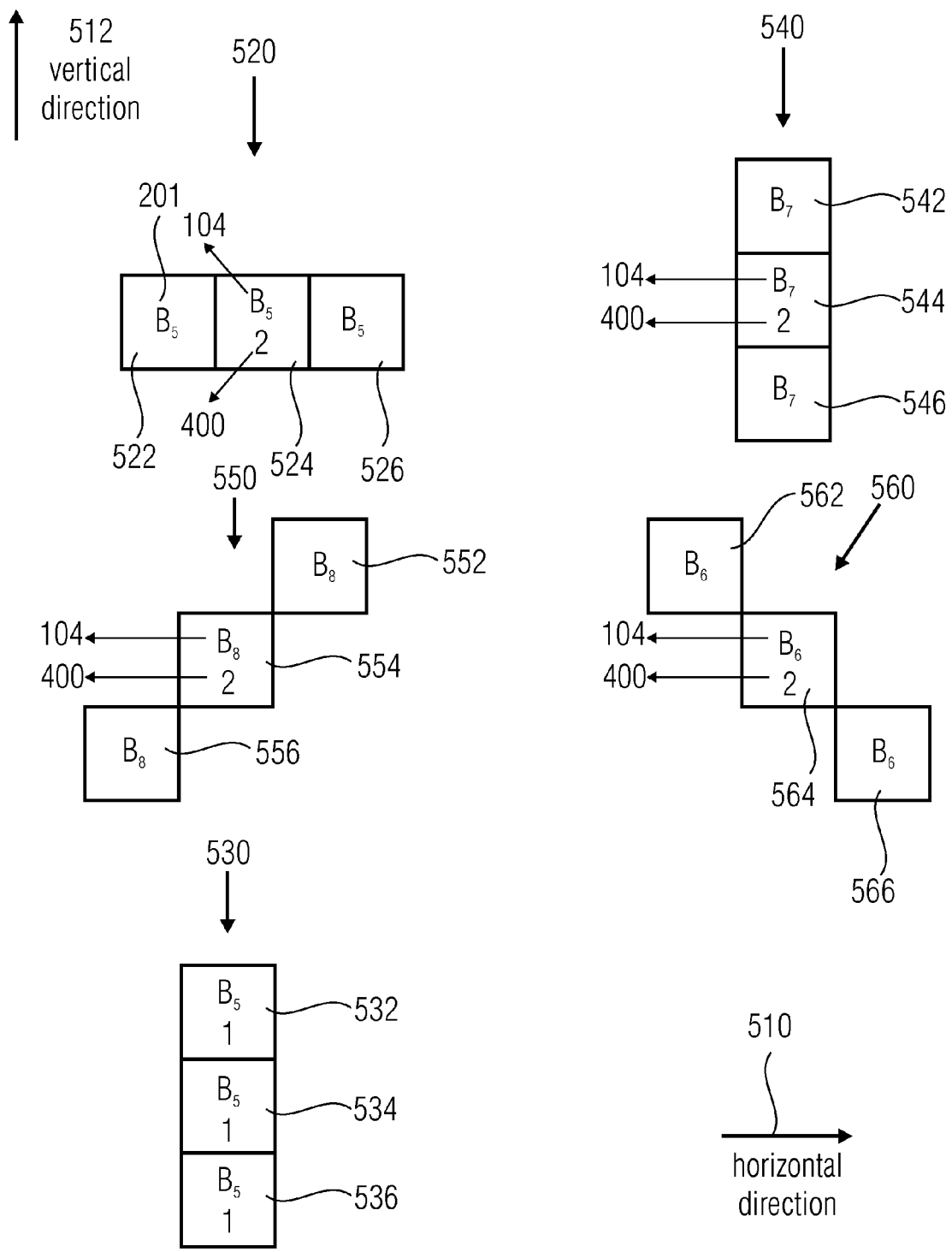
FIG. 5B shows a graphical illustration of a concept for weighting a texture edge type within a block.

FIG. 5A graphically illustrates the weighting of the occurrence of edge types. For this purpose, FIG. 5A shows a section of an illustration describing edge types allocated to the individual image parts (or pixels). In FIG. 5A a block 305 is illustrated, for example including 5×5 pixels (represented by the squares contained in block 5). To each of the pixels of which one is for example designated by 201, a texture edge type 104 (from an area between $B_0$ and $B_8$) and a weighting factor and/or a weighting 400 (for example a value of 1 or 2) is allocated. An image part or pixel is in one embodiment of the present invention weighted higher when the image part or the pixel is part of an extended edge extending across several image parts or pixels. It is assumed here that an extensive edge comprises a length which is at least equal to a predetermined minimum length. It may, for example, be defined that an extensive edge only exists when a line-shaped edge extends across at least three pixels. It is further to be noted that, for example, several pixels are classified as belonging to a common extensive edge only when the mentioned pixels (for example at least three) comprise the same edge type. Further, it may still be examined in this respect whether the pixels having the same edge type are arranged adjacent to each other in one direction which corresponds to the edge type of the pixels. This concept is explained in the following with reference to FIG. 5B. In this respect, FIG. 5B shows a schematical illustration of three adjacently arranged pixels each. A first direction (for example a horizontal direction) is designated by 510 and a second direction (for example a vertical direction) is designated by 512. A first graphical illustration 520 shows three pixels 522, 524, 526 which are arranged adjacent to each other in the horizontal direction (for example neighboring each other, but possibly also spaced apart from each other). All three pixels 522, 524, 526 comprise the edge type $B_5$ indicating a (local) horizontal edge. In other words, the pixel 522 is part of a local, horizontal edge, just like the pixel 524 and the pixel 526. As the pixels 522, 524, 526 are arranged next to each other in the horizontal direction or in a line and/or along one line, the pixels 522, 524, 526 are also part of an extensive horizontal edge. For this reason, the weighting factor 2 is allocated to the middle pixel, i.e. the pixel 524 (see reference numeral 400). A further, graphical illustration 530 shows three pixels 532, 534, 536 arranged next to each other in a vertical direction and all comprising the edge type $B_5$ ("horizontal edge"). In this case, while three pixels having the same edge type lie in one line, the edge type (here: "horizontal edge") does not correspond to the direction along which the pixels are arranged (here: vertical direction). Consequently, the pixels 532, 534, 536 have the weighting 1.

Similarly, a schematical illustration 540 shows three pixels 542, 544, 546 comprising the edge type $B_7$ ("vertical edge") and lying next to each other in a vertical direction. Correspondingly, the weighting factor 2 is allocated to the central pixel 544.

The schematical illustration 550 shows three pixels 552, 554, 556 arranged in a diagonal rising direction (in the illustration to the top right) next to each other and/or adjacently. As the three pixels 552, 554, 556 all comprise the edge type $B_8$ indicating a local diagonal (rising) edge, the weighting factor 2 is allocated to the central pixel 552 (see reference numeral 400).

A further schematical illustration 560 shows three pixels 562, 564, 566 arranged next to each other in a diagonally falling direction (in the illustration to the bottom right). As the edge type $B_6$ (diagonal falling edge) is allocated to all pixels 562, 564, 566, the weighting factor 2 is allocated to the central pixel 564.

A corresponding weighting of the edge types is also illustrated in the graphical illustration of FIG. 5A. Thus, the graphical illustration of FIG. 5A for example shows five pixels 504a, 504b, 504c, 504d, 504e all lying next to each other along a horizontal direction. Thus, it is determined, for example, that in a horizontal direction two pixels 504a, 504c lie next to the pixel 504b, wherein all the mentioned pixels 504a, 504b, 504c comprise the edge type "horizontal edge". Thus, a weighting fact of 2 is allocated to the occurrence of the edge type "horizontal edge" in the pixel 504b. For the same reason, the weighting factor 2 is allocated also to the occurrence of the edge type "horizontal edge" in the pixel 504c. The same applies to the weighting of the edge type "horizontal edge" in the pixel 504d.

It is determined accordingly that a pixel 506b lies between the pixels 506a and 506c, wherein the pixels 506a, 506b, 506c are arranged along a diagonally falling line, and wherein the same edge type "diagonal falling edge" is allocated to the pixels 506a, 506b, 506c.

If thus for one block an edge type histogram is generated, the same represents the weighted occurrence frequency of the individual edge types. If a weighting factor which is not 1 is allocated to a pixel, then the edge type for the corresponding pixel is counted repeatedly according to the weighting factor. If the pixel 504b comprises a weighting factor of 2, then the edge type allocated to the pixel 504b provides a contribution of 2 to the histogram. In other words, the pixel 504b is assumed to exist twice. A histogram formed based on the block 305 is by the way designated by 508. An abscissa 509a describes, how often the corresponding edge types occur in the block 305 (considering the weighting factors 400). Bar charts 509d-509l for example indicate how often the corresponding edge types occur in the block 305. Thus, for example, the edge type $B_2$, $B_3$, $B_4$, $B_7$, $B_8$ only occur once in the block 305. The edge type $B_1$ occurs three times in the block 305. The edge type $B_0$ occurs four times in the block 305. While the edge type $B_6$ only occurs four times in the block 305, based on the double weighting of the pixel 506b, in the histogram 508 for the edge type $B_6$ a weighted frequency value of 5 (3×1 plus 1×2) nevertheless results. The edge type $B_5$ occurs 9× in the block 305 (unweighted), but from the double weighting of the pixels 504b, 504c, 504e, 504f, 504g a weighted frequency value of 14 results for the edge type $B_5$ (4×1 plus 5×2=14).

According to one embodiment of the present invention, the mechanism for calculating the weighted edge frequency information and/or the weighted edge type histogram may be described as follows: a block of image parts (for example pixels) is selected for which then the edge type frequency information is determined. Subsequently, it is examined for several individual image parts whether a higher weighting than a standard weighting is to be allocated to the same (wherein the standard weighting is, for example, 1 or another predetermined standard weighting value). If it is determined that along one line passing through the considered image part in a certain and/or predetermined environment of the considered image part at least one predetermined minimum number of further image parts exists comprising the same edge type as the considered image part, and if it is further determined that the direction of the mentioned line corresponds to the edge type, then a higher weighting factor than the standard weighting factor is allocated to the considered image part. Otherwise, the weighting factor is set to the standard weighting factor or left unchanged.

It may, for example, first of all be checked which edge type the considered image part comprises. Accordingly, it may then, for example, be decided along which direction adjacent image parts are to be checked with regard to their edge types. If it is determined, for example, that the edge type "horizontal edge" is allocated to the considered image part, then adjacent image parts, for example, are examined and/or checked which are arranged in a horizontal direction next to the considered image part. Image parts arranged in other directions next to the considered image part are not considered, for example, in this case. If the two image parts adjacent in the horizontal direction comprise the same edge types as the considered image part, i.e., for example, also a horizontal edge type, it is assumed that the considered image part is part of an extensive edge. Accordingly, the weighting factor of the considered image part is increased. Otherwise, the weighting factor for the considered image part is left unchanged.

Apart from that, it is noted that in one embodiment a lower weighting factor is allocated to some edge types. For example, edge types with a low to average edge strength may be weighted with a standard weighting factor (for example of 1), while, however, only with edge types having a high edge strength a higher weighting may take place. Thus, the decision about a weighting factor of a considered image part also includes a decision about whether a higher weighting factor than the basic weighting factor and/or the standard weighting factor may be allocated to a certain edge type at all.

After a weighted edge type frequency information 1046 was formed for a block of image parts, as described above, a block edge type may thus be allocated to a block of image parts. For example, an edge type may be allocated to one block of image parts, i.e. one image section, as a block edge type to which in the weighted edge type frequency information a maximum frequency value is allocated. This allocation may, for example, be executed in a $7^{th}$ step 1048. In other words, from the texture edge type frequency of a block (i.e., for example, from the weighted edge type frequency information and/or from the weighted edge type histogram of a block) now the texture edge type is selected as the texture edge type representative for the block which has the highest weighted frequency value. In other words, for example in the histogram 508 according to FIG. 5A, the edge type (for example the edge type $B_5$) is identified which has the highest weighted frequency value (here: 14). It is thus decided that the block edge type $B_5$ is allocated to the block (for example the block 305). If two weighted frequency values (of two different edge types) are equal, a selection is executed, for example, according to the following order of the representative texture edge type (also designated by the reference numeral 402): $B_5$-$B_8$ comes before $B_1$ to $B_4$, and the same before $B_o$; and then in the order horizontal, vertical, diagonally rising, diagonally falling.

In this way, a texture edge type is uniquely allocated to each block (for example designated by block $(j_G, i_G)$) and thus to the corresponding grid point GP $(j_G, i_G)$.

In other words, a predetermined order exists how the block edge type is determined when several edge types comprise an equally weighted frequency value. Edge types to which a higher edge strength, or gradient strength, is allocated are advantageous with regard to edge types to which a lower edge strength, or gradient strength, is allocated. Accordingly, the edge types $B_5$ to $B_8$ to which a high gradient strength is allocated are advantageous with regard to the edge types $B_1$ to $B_4$ to which an average gradient strength is allocated, and further the edges types $B_1$ to $B_4$ to which an average gradient strength is allocated are advantageous to the edge type $B_0$ to which a low gradient strength is allocated. Further, a predetermined preference order with regard to the edge directions exists. An edge type to which a horizontal edge direction is allocated is advantageous with respect to an edge type to which a vertical edge direction is allocated. An edge type to which a vertical edge direction is allocated is advantageous with regard to an edge type to which a diagonally rising edge direction is allocated and an edge type to which a diagonally rising edge direction is allocated is advantageous with regard to an edge type to which a diagonally falling edge direction is allocated. Generally, it may also be noted that edge types whose edge direction is parallel to the image margins of the image are advantageous with regard to edge directions whose edge direction is diagonal to the image margins of the image.

Within the scope of the embodiment described with reference to FIGS. 1A to 1D, apart from that block edge types are calculated for several blocks. The calculation may, for example, be executed in the same way for all blocks.

In an $8^{th}$ step 1050 based on the block edge types for a plurality of blocks (for at least three blocks or even for at least four blocks) a group histogram is determined which describes a frequency of different edge types among the block edge types for the blocks belonging to the group. In other words, several blocks for which one block edge type each was determined are logically combined into one group of blocks. For the group of blocks thereupon a group histogram is generated. Here, for each block only one block edge type allocated to the block is considered. In other words, a histogram is generated with respect to how often the different edge types occur among the block edge types.

In other words, the next method step relates to generating partial texture edge histograms (also referred to as group histograms). In this respect, the image is divided, for example, into image rectangles (designated by reference numeral 500). The image rectangles, for example, cover the complete image. The image rectangles per se may also overlap. Here, different variants are possible: for example 3×3 or 4×4 rectangles of the same size or 2×2 rectangles of the same size and, centered in the image, a further rectangle of the same size, whereby the center area of the image is over-weighted. In an example described in the following, the image is divided into 2×2 rectangles $R_0$ to $R_3$ of the same size.

Figure 8:
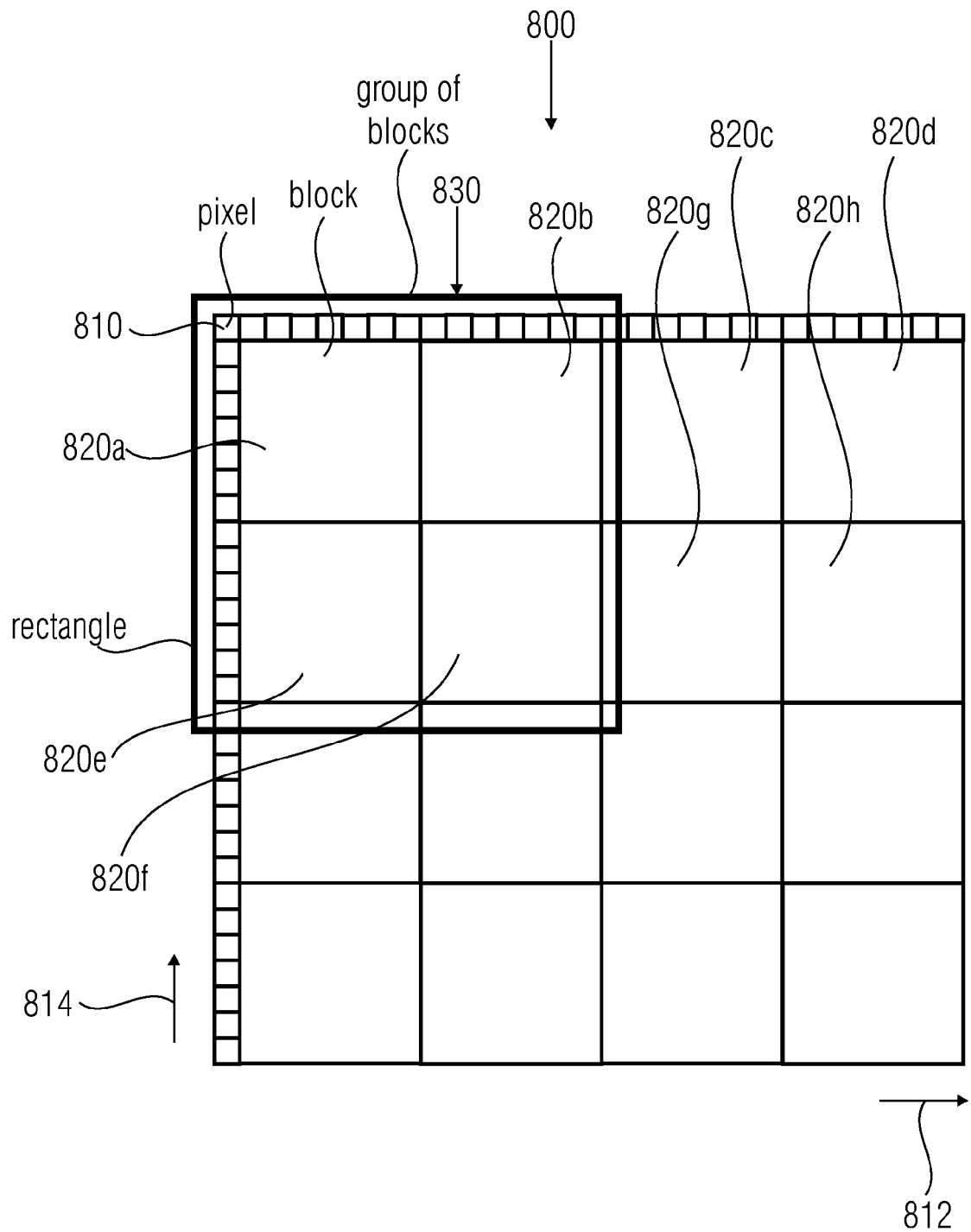
FIG. 8 shows a graphical illustration of an image, a rectangle, a block and a pixel.

For details with regard to dividing up an image, for illustration purposes reference is made to FIG. 8. FIG. 8 shows a graphical illustration of an image which is divided into pixels, blocks and groups of blocks.

FIG. 8 shows a graphical illustration of an image which is divided into a plurality of different subunits. The image according to FIG. 8 is designated by 800 in its entirety. The image 800 includes a plurality of pixels 810 forming a grid of pixels. The pixels are arranged in pixel lines, for example running in a horizontal direction 812, and pixel columns, for example running in a vertical direction 814. Typically, exactly one edge type is allocated to each pixel. Pixels may exist, however, to which no edge type is allocated, for example pixels along the image margins of the image 800. A block is formed by a plurality of pixels. Different blocks are designated by 820a to 820f. Each block 820a to 820f consists of a plurality of pixels. Thus, a block may, for example, consist of a rectangular or square arrangement of individual pixels. Information about weighted texture edge type frequencies is allocated, for example, to each block (i.e. for example a representation of a histogram which comprises as many individual values as edge types are defined). Further, to each of the blocks 820a to 820f a representative texture edge type is allocated, also referred to as block edge type. In addition, with regard to the image 800, for example several groups of blocks are defined. A first group of blocks is designated by 830 and includes, for example, the blocks 820a, 820b, 820e and 820f. A second group of blocks which is not individually designated for reasons of clarity includes, for example, the blocks 820c, 820d, 820g and 820h. The different groups of blocks are, for example, each rectangular and each include a plurality of blocks. A group of blocks is, incidentally, referred to as a "rectangle" within the scope of the present description. It is further to be noted that for each group of blocks a so-called partial texture edge histogram may be generated.

Figure 6:
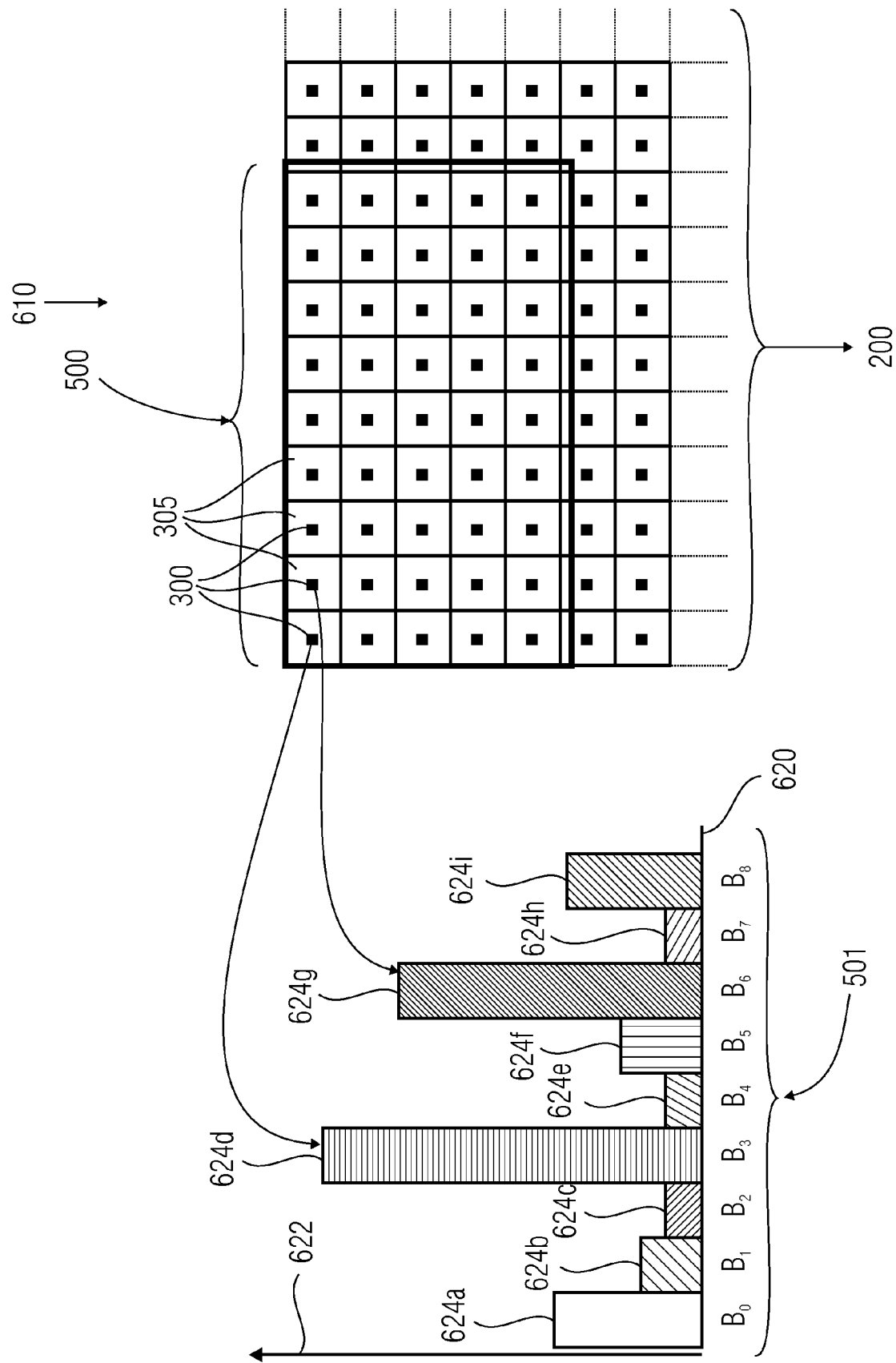
FIG. 6 shows a graphical illustration of a method for forming partial texture edge histograms for rectangles.

For a further illustration, reference is made to FIG. 6. In a graphical illustration 610, FIG. 6 illustrates a section of an image. Individual blocks, which are, for example, formed around selected grid points 300, are designated by 305. A group of blocks and/or an image rectangle is further designated by 500 and includes, for example, 9×6 blocks 305.

FIG. 6 further shows a graphical illustration of a partial texture edge histogram 501. At an abscissa 620, for example, the individual edge types $B_0$-$B_8$ are plotted, while an ordinate 622 describes a frequency of the different edge types $B_0$-$B_8$. Bars 624a to 624i describe the frequency of the different block edge types among the blocks 305 of the image rectangle 500.

If it is assumed that the image 1010 is divided into a plurality of rectangles and/or into a plurality of groups of blocks, then for each of these rectangles (and/or for each of those groups of blocks) a partial texture edge histogram 501 is generated as follows: the frequency of the texture edge type of the blocks "block $(j_G, i_G)$" is determined whose grid point GP $(j_G, i_G)$ is contained in the rectangle. In the described example, for each rectangle a partial texture edge histogram with 9 values is generated which are, for example, normalized after a division by the complete number of grid points contained in the respective rectangle. Thus, in the described example (wherein the image is divided into 2×2 rectangles $R_0$ to $R_3$ of the same size) four partial texture edge histograms are obtained having 9 values each thist$_k$(1), wherein k indicates an index of the corresponding rectangle and 1 the index of a value. In other words, for each group a representation of a histogram exists which describes an occurrence frequency of edge types among the block edge types of the blocks allocated to the group. Thus, as many values are allocated to each group of blocks, or each "rectangle", as different edge types exist. Also, another form of illustration may be chosen, however, by which the corresponding occurrence frequencies are described.

A $9^{th}$ step 1054 includes combining group histograms 1052 which were formed for several groups of blocks into a common histogram 1056. In other words, in a further and/or last method step, from all partial texture edge histograms (i.e. from group histograms for several groups of blocks) by lining up a texture edge histogram for the complete image is generated.

The corresponding histogram is referred to as hist, and for the individual elements and/or values hist(r) the following applies:

$$\text{hist}(k*9+1)=\text{thist}_k(1) \text{ with } 0 \leq k < 4 \text{ and } 0 \leq 1 < 9.$$

Figure 7:
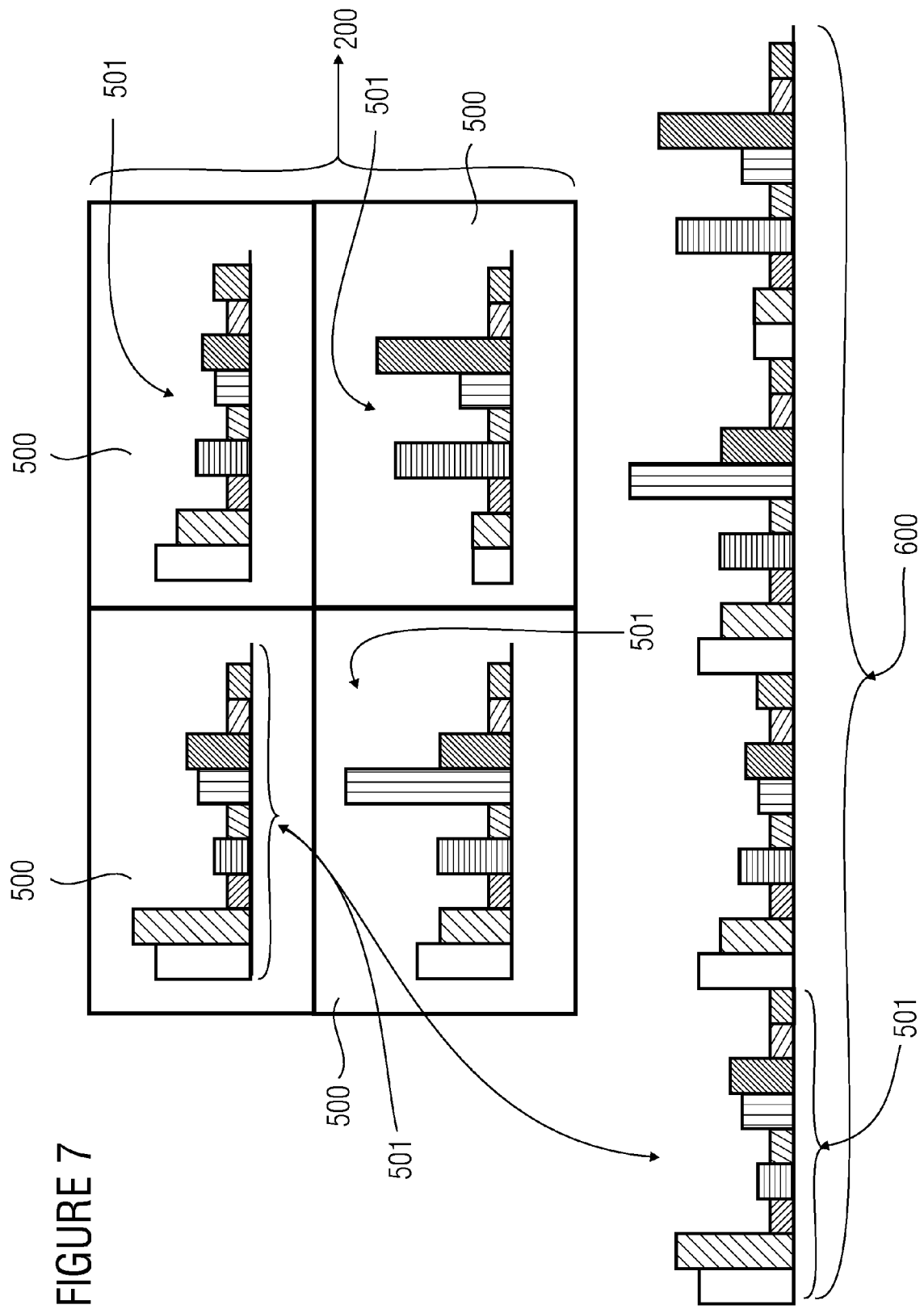
FIG. 7 shows a graphical illustration of a method for forming a texture edge histogram.

The above equation for determining the elements of the histogram hist applies, for example, for the case that four rectangles (referred to by the index k) and nine edge types (referred to by the index 1) exist. Putting together the partial texture edge histograms (and/or group histograms) into a texture edge histogram for the complete image (common histogram) is represented by FIG. 7. FIG. 7 shows an image 200 which is divided into four rectangles 500. For each rectangle, an allocated partial texture edge histogram 501 exists. By putting together for example the four respective partial texture edge histograms 501, thus a texture edge histogram 600 for the complete image 200 results.

In summary, it is thus to be noted that one embodiment of the invention relates to a method for generating a texture edge histogram of digital images using intensity values of the individual image elements (pixels). One embodiment of the inventive method for example includes the following method steps:

a) Calculating a horizontal and vertical gradient with regard to the intensity values for each pixel in the image.
b) Calculating the gradient strength and the gradient angle for each pixel in the image from the horizontal and vertical gradients.
c) Dividing the two-dimensional gradient strengths/gradient angle value range into disjunct and value range-covering partial areas such that exactly one partial area may be allocated to each pixel in the image by the gradient strength allocated to the same and by the gradient angle allocated to the same. The partial areas are, for example, determined such that they represent different texture edge types (monochrome areas; texture; edge).
d) Default of a two-dimensional grid net of grid points and formation of blocks around the grid points.
e) Calculating weighted texture edge type frequencies for each block by determining a weighted number of the pixels of the block with regard to the respective texture edge type.
f) Determining a representative texture edge type for each block by determining the texture edge type having the highest frequency in the block.
g) Dividing the image into rectangles such that the image is covered.
h) Generating partial texture edge histograms for each rectangle of the image by determining the frequency of the texture edge type of the blocks whose grid points are contained in the rectangles.
i) Generating a texture edge histogram of the complete image by lining up all partial texture edge histograms.

In this respect it is to be noted that the steps d) and f) to i) are used to evaluate the results of the steps c) and e).

The above-described concept may be modified substantially, as is explained in the following. It is first of all to be noted that the way in which the information about the gradient strength and gradient direction is calculated may be selected randomly. In other words, instead of steps 1032 to 1038 any method may be used that is suitable for determining information about the gradient strength and gradient direction. In one embodiment of the present invention, a special advantage is achieved by mapping the information about the gradient strength and gradient direction in a step 1040 to a local edge type 1020 for an image part so that, using the local edge type, at least three different gradient strengths may be differentiated. In other words, in the embodiment of the present invention it is only important that an allocation regulation for mapping the information about the gradient strength and gradient direction to the local edge type is used, according to which three different gradient strengths are allocated to three different local edge types. If, based on the above-mentioned information 1020 about a local edge type, thus an edge type histogram is formed, an edge type histogram results which includes information about whether in the image a basically monochrome area, a texture or a clearly visible edge exists and/or in which ratio the above-mentioned structures occur in the image. It is unimportant in the above-mentioned embodiment, however, how exactly the formation of the histogram takes place. In other words, it is not important in the above-mentioned embodiment how the further processing of the information 1020 about the local edge type is executed. Thus, in the above-mentioned embodiment, the steps 1042, 1048, 1050, 1054 may be replaced by a random generation of a histogram based on the information 1020 about the local edge type.

According to a further aspect of the present invention, in a further embodiment of the present invention the way in which the information 1020 about a local edge type is generated may be changed substantially. Thus, in the above-mentioned embodiment, it is only important that different local edge types may be differentiated. The way in which the information about the gradient strength and gradient direction is calculated and the way in which the local edge type is determined from the information about the gradient strength and gradient direction is not important in this embodiment. Moreover, it is not important either in the above-mentioned embodiment whether information about the gradient strength and gradient direction is determined at all. Rather, the information about the local edge type 1020 might also be gained in another way from the image 1010. An especially well applicable edge type histogram results in the mentioned embodiment by the calculation of the weighted edge type frequency information 1046 in the step 1042. The mentioned embodiment here basically profits from weighting. The weighted edge type frequency information which is obtained according to step 1042 may, however, also be used in a way other than that described above in order to generate an edge histogram. In other words, in the mentioned embodiment the steps 1048, 1050 and 1054 may also be replaced by one or several other steps. Apart from that, the weighted edge type frequency information 1046 may also be directly used as the edge type histogram.

According to a further aspect of the present invention a further embodiment exists in which a clear improvement of the quality of an edge type histogram is achieved by calculating a block edge type for a block of image parts according to step 1048 and by further determining a histogram based on the block edge types for several blocks. By the mentioned method a higher-order histogram results over the block edge types of several blocks, wherein for each block only one "dominant" edge type is used. In the method according to the corresponding embodiment, the improvement of the edge histogram is thus achieved by omitting information which is not dominant, i.e., for example, information about the other edge types which were not selected as block edge types. Thus, it is not important in the mentioned embodiment how the edge type frequency information for the blocks of image parts is calculated. It is thus neither important in the mentioned embodiment whether, when determining 1048 the block edge type, a weighted edge type frequency information for the blocks or a non-weighted edge type frequency information for the blocks is used. Apart from that, it is neither relevant in the mentioned embodiment how the information about the edge types is gained. In the mentioned embodiment, thus the steps 1032, 1034, 1036, 1038, 1040, 1042 may also be randomly changed or be completely omitted as long as it is guaranteed that, based on an edge type frequency information for a block of image parts, a block edge type is selected. In the mentioned embodiment, then, based on the block edge types for a plurality of blocks, a further histogram is formed, as was described with reference to the step 1050. It is, however, not of substantial importance how the corresponding group histogram 1052 is further processed.

In summary, it is thus to be noted that it is only important in the first embodiment how a local edge type may be obtained based on information about a gradient strength and a gradient direction using an allocation regulation. Details with respect to how the information about the gradient strength and gradient direction is generated and details of how a histogram is generated based on the local edge types are not important in this embodiment, however.

In a second embodiment it is important to generate a weighted edge type frequency information based on information about local edge types. In this second embodiment it is not important how information about local edge types is gained. Nor is it important how exactly an edge type histogram is gained from the weighted edge type frequency information.

In a third embodiment it is further important that a histogram about block edge types is formed. How the edge type frequency information needed for the determination of the block edge types is gained is, however, not important for the basic functioning of the third embodiment. It is further not important whether and, if applicable, how the group histogram is further processed.

In the following it is described as an example how the edge histograms calculated according to the invention may be processed further. The examples described in the following do not, however, represent final presentations of possible cases of application, but are merely to be considered as an example.

Figure 9A:
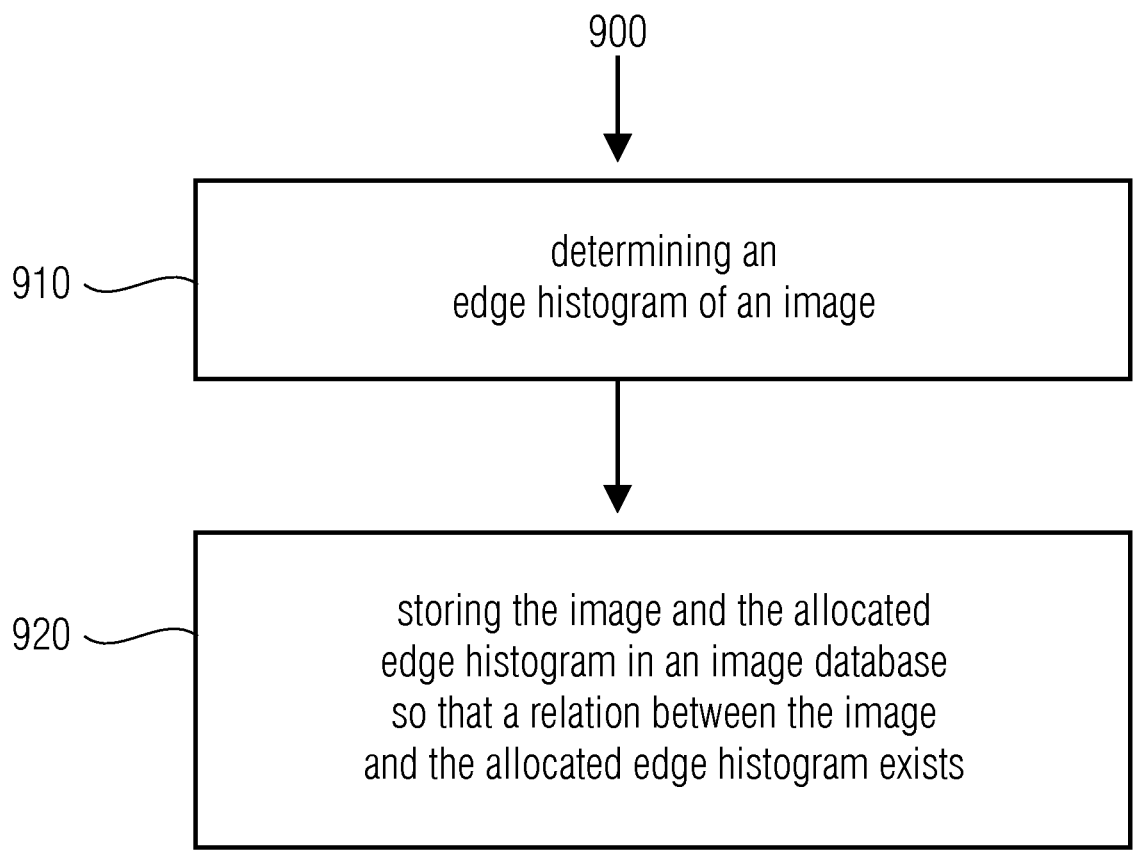
FIG. 9A shows a flowchart of a method for storing an image in an image database according to an embodiment of the present invention.

FIG. 9A is a flowchart of a method for storing an image in an image database. The method according to FIG. 9A is designated by 900 in its entirety. In a first step 910, the method 900 includes determining an edge histogram of an image, as was explained in detail within the scope of the present invention. In a second step 920, the method further includes storing the image and the allocated edge histogram in an image database so that a relationship between the image and the allocated edge histogram exists. Thus, for example, the edge histogram (in a compressed or uncompressed form) may be directly attached to the image or be embedded into the image. Thus, the edge histogram may, for example, be stored in a common file together with the image. As an alternative, a cross-reference may be made so that reference is made from the image stored in the database to the edge histogram stored in the database or vice versa. Thus, by the method 900, an image database results which includes in addition to the image the edge histogram belonging to the image. It thus becomes possible, using the image database, to identify an image especially reliably. The reason for this is that the edge histogram generated according to the invention is especially reliable due to the above-described way of generation.

Figure 9B:
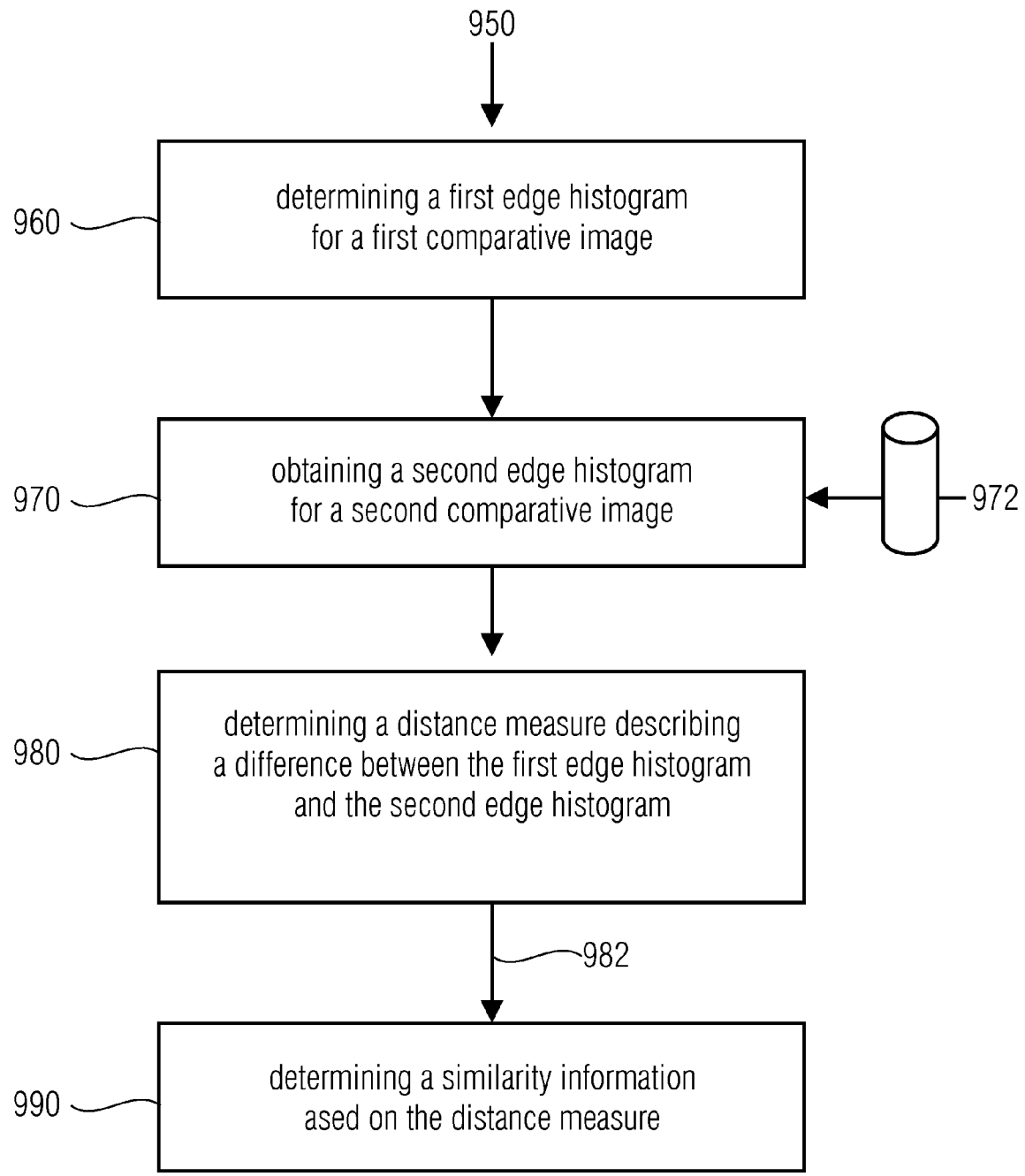
FIG. 9B shows a flowchart of a method for finding two similar images according to an embodiment of the present invention.

FIG. 9B shows a flowchart of a method of finding two similar images according to an embodiment of the present invention. The method according to FIG. 9B is designated by 950 in its entirety. The method 950 may, for example, be used to determine similarity information with regard to two given images. Apart from that, the method 950 may be used to identify an image in an image database based on a predetermined example image. In a first step 960, the method 950 includes determining a first edge histogram for a first comparative image. Determining the first edge histogram may, for example, be executed in the above-described way.

In a second step 970, the method 950 includes obtaining a second edge histogram for a second comparative image. The second edge histogram for the second comparative image may, for example, be obtained according to the above-described method. However, the second edge histogram may, for example, also be read from a data base 972 into which it was stored beforehand, for example. Storing the second edge histogram in the database is, however, not necessarily a part of the method 950.

In a third step 980 the method 950 further includes determining a distance measure describing a difference between the first edge histogram and the second edge histogram. Thus, a distance measure 982 may be obtained. The distance measure 982 is thus a measure for a difference between two images. If, for example, for the first comparative image and the second comparative image, corresponding texture edge histograms exist (for example a first texture edge histogram for the complete first image and a second texture edge histogram for the complete second image, as defined, for example, by hist), in a distance calculation of two images with regard to the texture edge histogram the two histograms may be treated as vectors. As a distance measure, for example conventional distance measures which apply for vectors, like, e.g., a Euclidean distance, are possible. In other words, an edge histogram for the first image may be regarded as a first vector and an edge histogram for the second image may be regarded as a second vector. A distance measure describing the difference between the two images may, for example, be calculated by determining a distance between the mentioned vectors. Different distance measures describing distances between two vectors are here known from the field of mathematics. Based on the distance measure 982, further in an (optional) fourth step 990 similarity information may be determined carrying information about a similarity between the first comparative image and the second comparative image. Based on the distance measure and/or on the similarity information, it may incidentally also be decided (for example using a threshold value) whether the first comparative image and the second comparative image are sufficiently similar. Based on this information, it may, for example, be further decided whether the second comparative image, for example stored in a database, is to be output to a user.

With regard to the above-described method it is to be noted that the method may be executed completely or in individual partial steps. The individual partial steps of the method may, moreover, also be executed in different places (for example on different networked computers).

The above-described methods may also be further realized by corresponding devices. For example, the above-described methods may also be realized by a corresponding circuitry. Apart from that, for example a logic circuit (for example a field programmable gate array, also know as FPGA) may be used to realize the above-described methods. The inventive methods may thus also be represented by corresponding programming data for an FPGA. Further, the inventive method may, for example, be realized by a computer which includes instructions which define the execution of the described method. The above-described methods may further be realized in software.

In other words, the inventive devices and the inventive methods may be implemented in hardware or in software. The implementation may be on a digital storage medium, for example a floppy disc, a CD, a DVD, an ROM, a PROM, an EPROM, an EEPROM or a FLASH memory with electronically readable control signals which may cooperate with a programmable computer system so that the corresponding method is performed. In general, the present invention thus also consists in a computer program product having a program code stored on a machine-readable carrier for executing the inventive method when the computer program product is executed on a computer. In other words, the invention may be realized as a computer program having a program code for executing the inventive method, when the computer program is executed on a computer.

In summary, it is to be noted that it was found that a description of images may be executed especially precisely when features describing both edges and textures are used in combination. Some embodiments of the present invention thus solve the object of considering both aspects (edges and textures) together in images in order to achieve better results across all possible image motifs in the search for similar images in databases.

In summary, it is further to be noted that embodiments of the present invention lead to significantly better search results in a similarity-based image search. This improvement also results from the fact that the frequencies of the edges and textures occurring in the individual image areas are considered together. Systems used today only consider edges and textures separately in many cases. By the described concept of considering edges and textures together, in some embodiments of the present invention overlayings are prevented which conventionally worsen search results, for example for images containing areas with textures (e.g. water surfaces, treetops, clouds).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining an edge histogram of an image based on information about a gradient strength and a gradient direction of a local gradient in an image content of a partial image of the image, comprising:
   an allocator which is implemented to allocate the information on the gradient strength and gradient direction based on an allocation regulation to an edge type to acquire an edge type information,
   wherein the allocation regulation is selected so that with a given gradient direction at least three different allocated edge types exist mirroring different gradient strengths; and
   an edge histogram determiner which is implemented to determine the edge histogram based on the edge type information so that in the edge type histogram at least three edge types with different allocated gradient strengths may be differentiated,
   wherein the allocator is implemented such that a directional resolution of the allocation with regard to the gradient direction is dependent on the gradient strength,
   wherein the allocator is implemented to allocate a first edge type to the information about the gradient strength and the gradient direction independent of the angle with a low gradient strength which is lower than a first gradient strength threshold value,
   to allocate an edge type from a first set of four edge types to the information about the gradient strength and the gradient direction depending on the gradient direction with an average gradient strength which is greater than the first gradient strength threshold value and smaller than a second gradient strength threshold value, and
   to allocate an edge type from a second set of edge types to the information about the gradient strength and the gradient direction depending on the gradient direction with a high gradient strength which is greater than the second gradient strength threshold value.

2. The device according to claim 1, further comprising a gradient determiner which is implemented to filter the image using a first filter operator to acquire a first gradient information with regard to a first direction in the image, which is implemented to filter the image using a second filter operator to acquire a gradient information with regard to a second direction in the image, and which is further implemented to acquire information about the gradient strength and the gradient direction based on the first gradient information and the second gradient information.

3. The device according to claim 2, wherein the gradient determiner is implemented to derive information about the gradient strength from the first gradient information and the second gradient information using a local standard operator.

4. The device according to claim 2, wherein the gradient determiner is implemented to acquire the first gradient information and the second gradient information so that the first direction is basically orthogonal to the second direction, and wherein the gradient determiner is further implemented to derive information about the gradient direction from the first gradient information and the second gradient information using a trigonometrical function.

5. The device according to claim 1, wherein the allocator is implemented to differentiate at least three intervals of gradient strengths in the allocation to edge types.

6. The device according to claim 1, wherein the allocator is implemented to allocate information about the gradient strength and the gradient direction independent of the angle to a first edge type when the gradient strength does not exceed a predetermined first gradient strength threshold value and to allocate the information about the gradient strength and the gradient direction dependent on the angle to different edge types when the gradient strength exceeds a predetermined second gradient strength threshold value.

7. The device according to claim 1, wherein the allocator is implemented such that the directional resolution of the allocation with regard to the gradient direction increases in at least two steps with an increasing gradient strength so that the directional resolution takes on at least three different stages depending on the gradient strength.

8. The device according to claim 1, wherein the allocator is implemented to differentiate all in all nine edge types, wherein the second set of edge types comprises four different edge types.

9. The device according to claim 1, wherein the allocator is implemented to process the gradient direction in the form of a gradient angle.

10. The device according to claim 1, wherein the edge histogram determiner comprises a weighted edge histogram determiner which is implemented to determine a weighted edge type frequency information describing an occurrence frequency of different local edge types with respect to an image section which comprises a plurality of image parts in order to acquire the edge histogram;
   wherein the weighted edge histogram determiner is implemented to weight the occurrence of local edge types in image parts belonging to an extensive edge extending across several image parts higher in the determination of the weighted edge type frequency information than the occurrence of local edge types belonging to isolated local edges.

11. A device for determining an edge histogram of an image based on information about a gradient strength and a gradient direction of a local gradient in an image content of a partial image of the image, comprising:
   an allocator which is implemented to allocate the information on the gradient strength and gradient direction based on an allocation regulation to an edge type to acquire an edge type information,
   wherein the allocation regulation is selected so that with a given gradient direction at least three different allocated edge types exist mirroring different gradient strengths; and an edge histogram determiner which is implemented to determine the edge histogram based on the edge type information so that in the edge type histogram at least three edge types with different allocated gradient strengths may be differentiated, wherein the allocator is implemented such that a directional resolution of the allocation with regard to the gradient direction is dependent on the gradient strength, wherein the device is implemented to acquire information about gradient strengths and gradient directions for a plurality of adjacent image parts of the image and to acquire associated information about local edge types for a plurality of adjacent image parts of the image, wherein the edge histogram determiner is implemented to determine a histogram combining edge type frequency information for several image parts belonging to a first block of image parts and to determine an edge type to which a maximum frequency value is allocated in the histogram as a block edge type for the first block;

wherein the edge histogram determiner is further implemented to determine a respective histogram and a respective block edge type for a plurality of further blocks; and wherein the edge histogram determiner is further implemented to determine a histogram describing a frequency of different edge types among the block edge types for the different blocks to acquire the edge histogram for the image.

12. A device for determining an edge histogram of an image based on information about local edge types for a plurality of adjacent image parts of the image, comprising:

a weighted edge histogram determiner which is implemented to determine a weighted edge type frequency information describing an occurrence frequency of different local edge types for an image section including a plurality of image parts in order to acquire the edge histogram;

wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts, wherein the device comprises an allocator which is implemented to acquire information about a gradient strength and a gradient direction of a local gradient in an image content of a partial image of the image and to allocate the information on the gradient strength and the gradient angle based on an allocation regulation to an edge type to acquire the information about local edge types, wherein the allocation regulation is selected such that with a predetermined gradient direction at least three different allocated edge types exist mirroring the different gradient strengths; and wherein the device is implemented to determine the edge histogram based on the edge type information such that in the edge type histogram at least three edge types comprising different allocated gradient strengths may be differentiated.

13. The device according to claim 12, wherein the image parts are pixels.

14. The device according to claim 13, wherein a local edge type for a pixel describes an image content transition in a limited environment of the pixel.

15. The device according to claim 14, wherein the limited environment of the pixel comprises a size of a maximum of 9×9 pixels.

16. The device according to claim 12, wherein the weighting edge histogram determiner is implemented to detect a considered image part as belonging to an extensive edge when the considered image part lies between two further image parts comprising the same local edge type as the considered image part.

17. The device according to claim 16, wherein the weighting edge histogram determiner is implemented to identify the considered image part as belonging to an extensive edge only when the considered image part and the two further image parts comprising the same edge type as the considered image part lie along a line whose direction corresponds to an edge direction allocated to the common edge type.

18. The device according to claim 12, wherein the weighting edge histogram determiner is implemented to identify a considered image part as belonging to an extensive edge only when an edge strength allocated to the considered image part is greater or equal to a predetermined edge strength threshold value.

19. The device according to claim 12, wherein the weighting edge histogram determiner is implemented to weight an occurrence of a local edge type in an image part belonging to an extensive edge, with respect to an occurrence of a local edge type in an image part belonging to an isolated local edge, with a weighting factor in a range between 1.5 and 5.

20. A device for determining an edge histogram of an image based on information about local edge types for a plurality of adjacent image parts of the image, comprising:

a weighted edge histogram determiner which is implemented to determine a weighted edge type frequency information describing an occurrence frequency of different local edge types for an image section including a plurality of image parts in order to acquire the edge histogram;

wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts, wherein the weighted edge histogram determiner is implemented to determine a weighted edge type frequency information combining edge type frequency information for several image parts belonging to a first block of image parts, and to determine an edge type to which, in the weighted edge type frequency information, a maximum weighted frequency value is allocated, as a block edge type for the first block, wherein the weighting edge histogram determiner is further implemented to determine a respective weighted edge frequency information and a respective block edge type for a plurality of further blocks; and wherein the weighting edge histogram determiner is further implemented to determine a histogram describing a frequency of different edge types among the block edge types for the different blocks to acquire the edge histogram for the image.

21. The device according to claim 11, wherein the edge histogram determiner is implemented to combine a first plurality of blocks into a first group of blocks and to combine a second plurality of blocks which is different from the first plurality of blocks by at least one block into a second group of blocks;
    wherein the edge histogram determiner is implemented to acquire a first group histogram describing a frequency of different edge types among the block edge types for the blocks of the first group of blocks and to acquire a second group histogram describing a frequency of different edge types among the block edge types for the blocks of the second group of blocks; and
    wherein the edge histogram determiner is implemented to combine the first group histogram and the second group histogram into a complete histogram.

22. The device according to claim 11, wherein the edge histogram determiner is implemented to divide the image into a plurality of groups of blocks, wherein each block comprises a plurality of image parts,
    to acquire for each of the groups of blocks an allocated group histogram; and
    wherein the edge histogram determiner is implemented to combine the group histograms by lining up the group histograms into a complete histogram.

23. The device according to claim 22, wherein the edge histogram determiner is implemented to select a further group of blocks in addition to the groups of blocks into which the image is divided which comprises an image center in order to increase an influence of the image center on the complete histogram.

24. The device according to claim 21, wherein a group of blocks defines a rectangular image area.

25. The device according to claim 11, wherein all groups of blocks define image areas of an equal size.

26. The device according to claim 11, wherein the edge histogram determiner is implemented to prefer an edge type to which a comparatively high edge strength is allocated as compared to an edge type to which a comparatively low edge strength is allocated in the determination of the block edge type, when the same frequency value is allocated to the edge types.

27. The device according to claim 11, wherein the edge histogram determiner is implemented to consider edge types to which the same frequency values and different directions are allocated in a predetermined order in the determination of the block edge type.

28. A device for storing an image in an image database, comprising:
    a device for determining an edge histogram of the image based on information about a gradient strength and a gradient direction of a local gradient in an image content of a partial image of the image, comprising:
        an allocator which is implemented to allocate the information on the gradient strength and gradient direction based on an allocation regulation to an edge type to acquire an edge type information,
        wherein the allocation regulation is selected so that with a given gradient direction at least three different allocated edge types exist mirroring different gradient strengths; and
        an edge histogram determiner which is implemented to determine the edge histogram based on the edge type information so that in the edge type histogram at least three edge types with different allocated gradient strengths may be differentiated,
        wherein the allocator is implemented such that a directional resolution of the allocation with regard to the gradient direction is dependent on the gradient strength;
    a device for determining an edge histogram of an image based on information about local edge types for a plurality of adjacent image parts of the image, comprising:
        a weighted edge histogram determiner which is implemented to determine a weighted edge type frequency information describing an occurrence frequency of different local edge types for an image section including a plurality of image parts in order to acquire the edge histogram;
        wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information,
        wherein the weighting edge histogram determiner is implemented to decide whether an image part belongs to an extensive edge using a comparison of information about local edge types of at least two adjacent image parts; and
    a storing unit for storing the image and the allocated edge histogram in the image database so that a relationship between the image and the allocated edge histogram exists.

29. A device for finding two similar images, comprising:
an edge histogram determiner which is implemented to determine a first edge histogram for a first comparative image comprising:
a device for determining an edge histogram of the image based on information about a gradient strength and a gradient direction of a local gradient in an image content of a partial image of the image, comprising:
    an allocator which is implemented to allocate the information on the gradient strength and gradient direction based on an allocation regulation to an edge type to acquire an edge type information,
    wherein the allocation regulation is selected so that with a given gradient direction at least three different allocated edge types exist mirroring different gradient strengths; and
    an edge histogram determiner which is implemented to determine the edge histogram based on the edge type information so that in the edge type histogram at least three edge types with different allocated gradient strengths may be differentiated,
    wherein the allocator is implemented such that a directional resolution of the allocation with regard to the gradient direction is dependent on the gradient strength;
a device for determining an edge histogram of an image based on information about local edge types for a plurality of adjacent image parts of the image, comprising:
    a weighted edge histogram determiner which is implemented to determine a weighted edge type frequency information describing an occurrence frequency of different local edge types for an image section including a plurality of image parts in order to acquire the edge histogram;
wherein the weighted edge histogram determiner is implemented to weight the occurrence of local edge types in image parts belonging to an extensive edge extending across several image parts higher than the occurrence of local edge types belonging to isolated local edges when determining the weighted edge type frequency information, wherein the weighting edge histogram determiner is implemented to decide whether an image part belongs to an extensive edge using a comparison of information about local edge types of at least two adjacent image parts;

a device for acquiring a second edge histogram of a second comparative image;

a similarity information determiner which is implemented to acquire similarity information describing a similarity between an image content of the first comparative image and an image content of the second comparative image, wherein the similarity information determiner is implemented to acquire the similarity information based on a distance measure, wherein the distance measure describes a difference between the first edge histogram and the second edge histogram.

30. A method for storing an image in an image database, comprising:

determining an edge histogram of the image using a method for determining an edge histogram of an image, comprising:

acquiring information about a gradient strength and a gradient direction of a local gradient in an image content of a partial image of the image;

allocating information about the gradient strength and the gradient direction to an edge type based on an allocation regulation in order to acquire edge type information, wherein the allocation regulation is selected such that with a given gradient direction at least three different allocated edge types exist mirroring the different gradient strengths; and determining the edge histogram based on the edge type information so that in the edge type histogram at least three edge types comprising different allocated gradient strengths may be differentiated, wherein allocating is executed so that a directional resolution of the allocation with respect to the gradient direction is dependent on the gradient strength; and a method for determining an edge histogram of an image, comprising:

acquiring information about local edge types for a plurality of adjacent image parts of the image;

determining a weighted edge type frequency information describing an occurrence frequency of different local edge types for an image section including a plurality of image parts in order to acquire the edge histogram;

wherein, when determining the weighted edge type frequency information, the occurrence of local edge types in image parts belonging to an extensive edge extending across several image parts is weighted higher than the occurrence of local edge types of isolated local edges, wherein the weighting edge histogram determiner is implemented to decide using a comparison of information on local edge types of at least two adjacent image parts whether an image part belongs to an extensive edge storing the image and the allocated edge histogram in an image database so that a relationship between the image and the allocated edge histogram exists.

31. A method for finding two similar images, comprising:
determining a first edge histogram for a first comparative image using a method for determining an edge histogram of an image, comprising:

acquiring information about a gradient strength and a gradient direction of a local gradient in an image content of a partial image of the image;

allocating information about the gradient strength and the gradient direction to an edge type based on an allocation regulation in order to acquire edge type information, wherein the allocation regulation is selected such that with a given gradient direction at least three different allocated edge types exist mirroring the different gradient strengths; and determining the edge histogram based on the edge type information so that in the edge type histogram at least three edge types comprising different allocated gradient strengths may be differentiated, wherein allocating is executed so that a directional resolution of the allocation with respect to the gradient direction is dependent on the gradient strength; and a method for determining an edge histogram of an image, comprising:

acquiring information about local edge types for a plurality of adjacent image parts of the image;

determining a weighted edge type frequency information describing an occurrence frequency of different local edge types for an image section including a plurality of image parts in order to acquire the edge histogram;

wherein, when determining the weighted edge type frequency information, the occurrence of local edge types in image parts belonging to an extensive edge extending across several image parts is weighted higher than the occurrence of local edge types of isolated local edges, wherein the weighting edge histogram determiner is implemented to decide using a comparison of information on local edge types of at least two adjacent image parts whether an image part belongs to an extensive edge;

acquiring a second edge histogram for a second comparative image;

determining similarity information describing a similarity between image contents of the first comparative image and the second comparative image, wherein the similarity information is determined based on a distance measure, and wherein the distance measure describes a difference between the first edge histogram and the second edge histogram.

32. A non-transitory computer readable medium having a computer program with program code for executing, when the computer program runs on a computer, a method according to claim 30.

33. A non-transitory computer readable medium having a computer program with program code for executing, when the computer program runs on a computer, a method according to claim 31.

* * * * *